(12) United States Patent
Miura et al.

(10) Patent No.: US 7,215,823 B2
(45) Date of Patent: May 8, 2007

(54) DEBLOCKING AND DERINGING APPARATUS, PROGRAM AND METHOD

(75) Inventors: Hirotsuna Miura, Fujimi-machi (JP); Masaki Ishikawa, Kunitachi (JP)

(73) Assignee: Seiko Epson Corporation, Tokyo (JP)

( * ) Notice: Subject to any disclaimer, the term of this patent is extended or adjusted under 35 U.S.C. 154(b) by 1011 days.

(21) Appl. No.: 10/193,306

(22) Filed: Jul. 12, 2002

(65) Prior Publication Data
US 2003/0021489 A1    Jan. 30, 2003

(30) Foreign Application Priority Data
Jul. 24, 2001  (JP)  ............... 2001-223612
Jul. 9, 2002   (JP)  ............... 2002-200577

(51) Int. Cl.
*G06K 9/40*  (2006.01)
(52) U.S. Cl. ...................... 382/268; 382/260
(58) Field of Classification Search ................ 382/270, 382/268, 260
See application file for complete search history.

(56) References Cited

U.S. PATENT DOCUMENTS

| | | | |
|---|---|---|---|
| 5,229,864 A * | 7/1993 | Moronaga et al. | 382/261 |
| 5,852,475 A * | 12/1998 | Gupta et al. | 348/606 |
| 6,167,164 A | 12/2000 | Lee | |
| 6,188,799 B1 * | 2/2001 | Tan et al. | 382/260 |

FOREIGN PATENT DOCUMENTS

| | | |
|---|---|---|
| JP | A 3-46482 | 2/1991 |
| JP | A 11-98505 | 4/1999 |

OTHER PUBLICATIONS

Cheung et al., "Improving MPEG-4 coding performance by jointly optimizing compression and blocking effect elimination", IEE proc.-Vis. Image Signal Process., vol. 148, No. 3, Jun. 2001.

* cited by examiner

*Primary Examiner*—Matthew C. Bella
*Assistant Examiner*—Dennis Rosario
(74) *Attorney, Agent, or Firm*—Oliff & Berridge, PLC

(57) ABSTRACT

An image processor is provided which simplifies filter processing and increases the speed when an image is decoded, and is suitable for realizing effective screen effect.

In deblocking filter processing, as to a pixel array intersecting a boundary between adjacent blocks, pixel values $v_2'$ to $v_7'$ after filtering are computed by filter arithmetic equations as shown below $$v_2'=(v_2+v_5)/2+(v_2-v_5)/4$$

$$v_3'=(v_3+v_5)/2+(v_3-v_5)/8$$

$$v_4'=(v_4+v_5)/2$$

$$v_5'=(v_5+v_4)/2+(v_5-v_4)/8$$

$$v_6'=(v_6+v_4)/2+(v_6-v_4)/4$$

$$v_7'=(v_7-(v_7-v_4)/8.$$

21 Claims, 16 Drawing Sheets

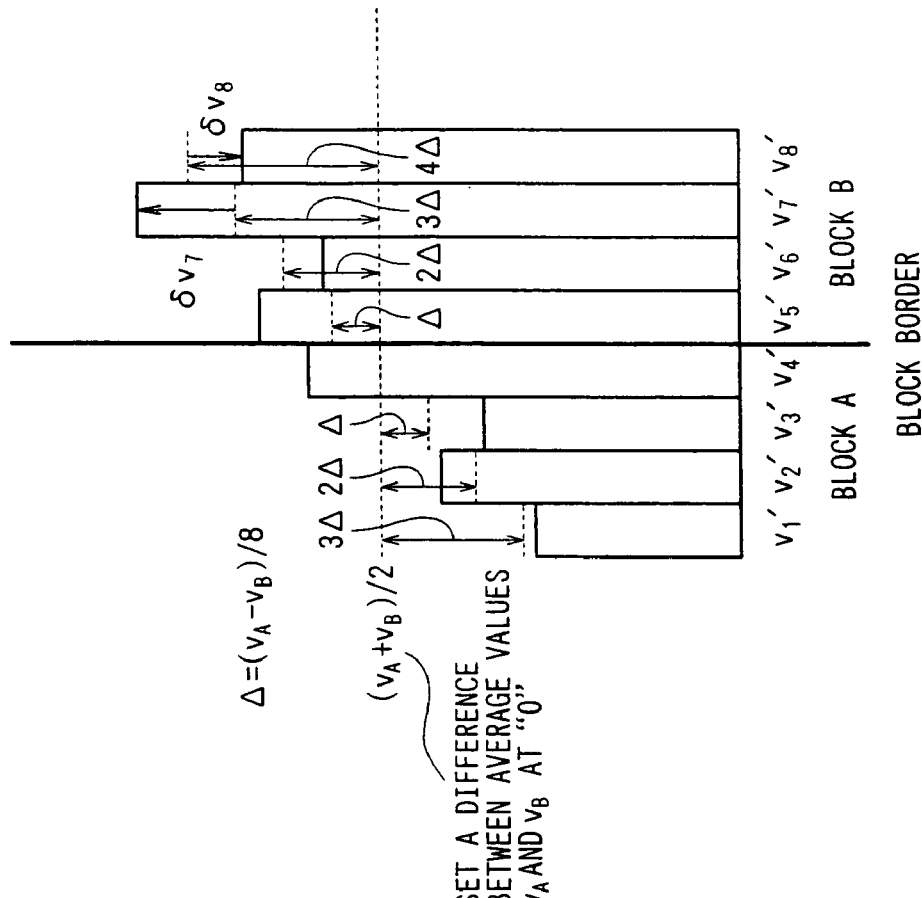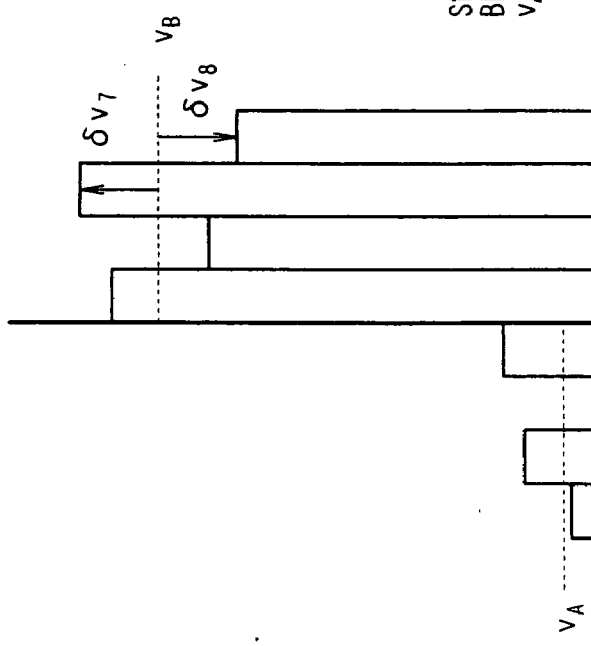

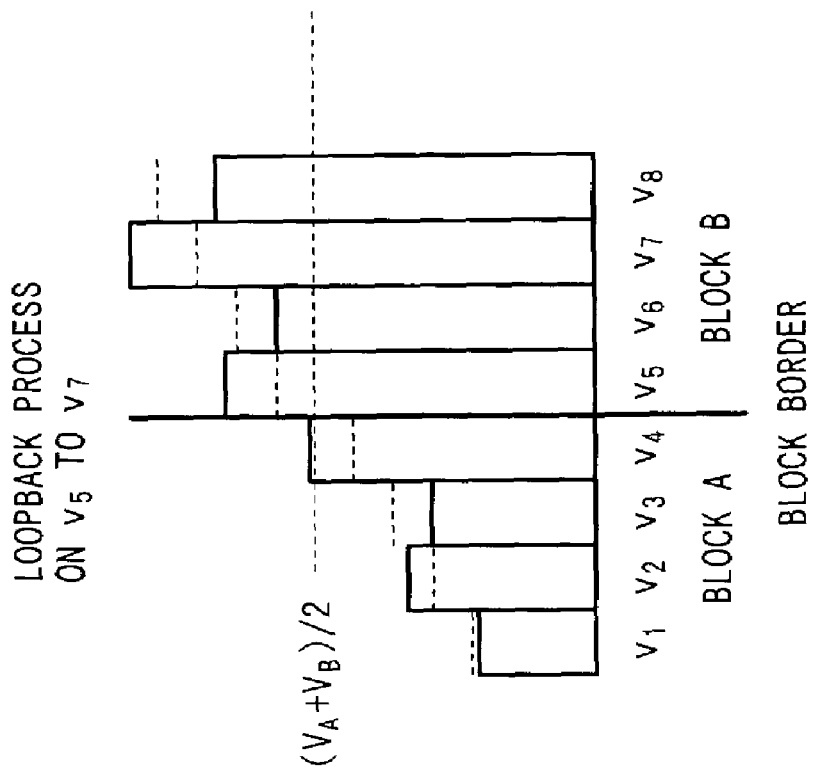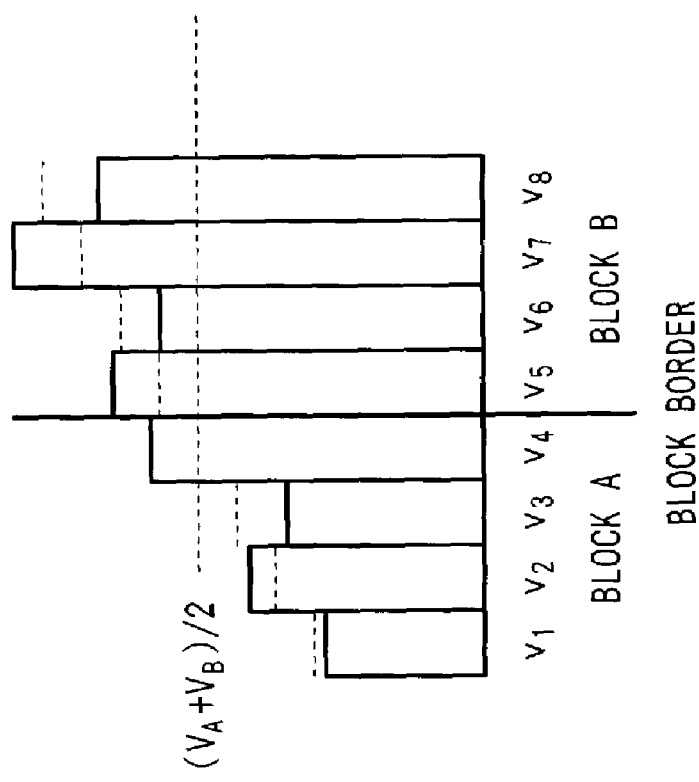

DEBLOCKING AND DERINGING APPARATUS, PROGRAM AND METHOD

BACKGROUND OF THE INVENTION

1. Field of the Invention

The present invention relates to a processor, a program, and a method for performing filter processing on an expanded image when images are expanded in the unit of blocks based on compressed image data which is compressed in JPEG (Joint Photographic Coding Experts Group) or MPEG (Moving Picture Experts Group) and so on, and particularly concerns an image processor, an image processing program, and an image processing method that can simplify filter processing and increase its speed when an image is decoded, and are suitable for an effective screen effect.

2. Description of the Related Art

JPEG has been widely known as compressing technique for a static image, and MPEG has been widely known as compressing technique for a moving image. In such image compressing methods, a block of 8×8 pixels is used as one unit and DCT (Discrete Cosine Transform) is performed. DCT is processing for decomposing an original image into spatial frequency components. An image can be compressed by reducing spatially redundant information.

Incidentally, when JPEG or MPEG is adopted, two kinds of noise is generated as will be discussed below and the noise deteriorates picture quality. Namely, in JPEG and MPEG, since a block of 8×8 pixels is used as a processing unit, in some images, a border of the block is observed as noise. This is because DCT is processing for removing some components corresponding to direct-current components from spatial frequency components of an image, the processing is performed for each block, and an average value of luminance is varied from block to block. Noise on the border is referred to as block noise.

Further, in DCT performed in JPEG and MPEG, harmonic components are removed as redundant information from spatial frequency components of an image. Thus, noise is generated on a part having a large luminance difference from the surrounding parts. In the case of large variations in luminance in a block, for example, when characters exist in the background of a natural picture, harmonic components are removed by DCT from data constituting an original border, resulting in blurred noise around the border. Such noise is referred to as mosquito noise.

Japanese Patent Laid-Open No. 3-46482 discloses technique for reducing block noise and mosquito noise. In the technique disclosed in the publication (hereinafter, referred to as a first conventional example), when border pixels positioned so as to interpose a border of adjacent blocks have a larger signal level difference than a first threshold value, and when a signal level difference between a border pixel and a pixel adjacent to the border pixel in the same block is smaller than a second threshold value regarding border pixels and pixels on arrays in blocks, filter processing is performed.

In this case, in FIG. 19, based on differences d0, d1, and d2 of signal levels $S_1$, $S_0$, $S'_0$, and $S'_1$ regarding pixel arrangements X1 and X0 and pixel arrangements X'0 and X'1 that are positioned on both sides of a block border, a signal level of the pixel arrangements X0 and X'0 is corrected. Namely, new signal levels $S_{0\text{-}new}$ and $S'_{0\text{-}new}$ are obtained by the equations shown below.

$$S_{0\text{-}new} = (S_1 + 2 \cdot S_0 + S'_0)/4$$

$$S'_{0\text{-}new} = (S_0 + 2 \cdot S'_0 + S'_1)/4$$

As another method for reducing block noise and mosquito noise, VM (Verification Model) concerning MPEG4 and technique disclosed in Japanese Patent Laid-Open No. 11-98505 (hereinafter, referred to as a second conventional example) have been known. In the second conventional example, it is judged whether vertical and horizontal block borders of FIG. 20 are in default mode or in DC offset mode, and processing is performed for each of the modes.

In this case, pixels sets S0, S1, and S2 are defined while block borders B1 and B2 are used as base points, and it is selectively determined whether a deblocking mode is the default mode or the DC offset mode according to a mode decision value based on a degree of block distortion phenomenon. And then, when the mode is judged as the default mode, four-point DCT kernel is used to find frequency information around the block borders of pixels. When the mode is judged as the DC offset mode in the mode decision step, it is judged whether the DC offset mode needs to be carried out, and block distortion phenomenon is removed if necessary.

However, in the first conventional example, since only the border pixels are corrected, distortion of blocks cannot be sufficiently removed. Further, in VM and the second conventional example, the processing is complicated and calculation load is too heavy.

Moreover, when such techniques are realized by hardware, since the processing is relatively complicated, it is difficult to reduce the size of a circuit. In view of miniaturization, it is desirable to simplify the processing as possible even if the picture quality is somewhat sacrificed. Additionally, since a mounted memory is limited in capacity, it is desirable to minimize a memory capacity occupied for computation in filter processing.

SUMMARY OF THE INVENTION

Hence, the present invention has been devised in view of the above-described unsolved problems of the conventional technique. The present invention has as its first objective the provision of an image processor and an image processing program, and an image processing method that can simplify filter processing, increase its speed when an image is decoded, and are suitable for realizing effective screen effect. Further, the present invention has as its second objective the provision of an image processor and an image processing program, and an image processing method that are suitable for reducing a memory capacity occupied for computation in filter processing when an image is decoded.

In order to attain the above-described objectives, an image processor according to claim 1 of the present invention performs filter processing on an expanded image when or after the image is expanded in the unit of predetermined blocks based on compressed image data compressed by image compression, in which discrete cosine transform and quantization are performed in the unit of blocks, the filter processing is performed such that filter arithmetic operation is performed on one pixel in the block only based on a value of the pixel and a value of any one of pixels in an adjacent block.

In such a configuration, when or after an image is expanded in the unit of blocks based on compressed image data, according to the filter processing, filter arithmetic operation is performed on one pixel in a block only based on a value of the pixel and a value of any one of pixels in the adjacent block.

Further, in the image processor according to claim 1, an image processor according to claim 2 performs filter processing such that filter arithmetic operation is performed on one of pixels in a pixel array intersecting a border between adjacent blocks, only based on a value of the pixel and a value of any one of pixels in the same pixel array of the adjacent block.

In such a configuration, according to the filter processing, filter arithmetic operation is performed on one of pixels in a pixel array intersecting the border only based on a value of the pixel and a value of any one of pixels in the same pixel array of the adjacent block.

Furthermore, in the image processor according to any one of claims 1 and 2, an image processor according to claim 3 of the present invention performs the filter processing such that filter arithmetic operation is performed on one of pixels in a pixel array intersecting a border between adjacent blocks, only based on a value of the pixel and a value of a border pixel positioned on the border in the same pixel array of an adjacent block.

In such a configuration, according to the filter processing, filter arithmetic operation is performed on one of the pixels in the pixel array intersecting the border, only based on a value of the pixel and a border pixel in the same pixel array of the adjacent block.

Besides, in the image processor according to any one of claims 1 to 3, an image processor according to claim 4 of the present invention performs the filter processing such that as to a pixel array intersecting a border between adjacent blocks, when pixel values on one side of the border is referred to as $v_4$, $v_3$, and $v_2$ in the order of being close to the border and pixel values on the opposite side of the border are referred to as $v_5$, $v_6$, and $v_7$ in the order of being close to the border, pixel values $v_2'$ to $v_7'$ after filtering are computed by filter arithmetic equations of "$v_2'=(v_2+v_5)/2+(v_2-v_5)/4$", "$v_3'=(v_3+v_5)/2+(v_3-v_5)/8$", "$v_4'=(v_4+v_5)/2$", "$v_5'=(v_5+v_4)/2+(v_5-v_4)/8$", "$v_6'=(v_6+v_4)/2+(v_6-v_4)/4$", and "$v_7'=(v_7-v_4)/8$".

In such a configuration, according to the filter processing, pixels values $v_2'$ to $v_7'$ after filtering are computed by the above filter arithmetic equations as to a pixel array intersecting the border.

Furthermore, in the image processor according to any one of claims 1 to 4, an image processor according to claim 5 of the present invention performs the filter processing such that filter arithmetic operation is performed on one of pixels in a pixel array intersecting a border between adjacent blocks when no difference between pixels exceeds a threshold value, the pixels ranging from one pixel to a border pixel positioned on the border in the same pixel array in the adjacent block, and a constant value is used as the threshold value.

In such a configuration, according to the filter processing, filter arithmetic operation is performed on one of pixels in a pixel array intersecting a border when no difference between pixels exceeds a threshold value, the pixels ranging from one pixel to the border pixel positioned on the border in the same pixel array in the adjacent block. Here, since the threshold value is a constant value, it is not necessary to compute a threshold value in the filter processing.

Additionally, in the image processor according to claim 5, an image processor according to claim 6 of the present invention is characterized in that a threshold value for comparison with a difference between the border pixel and a adjacent pixel being adjacent to the border pixel is set larger than a threshold value for comparison with a difference between the border pixel and a pixel other than the adjacent pixel.

In such a configuration, when a difference between a border pixel and an adjacent pixel is compared, the comparison is made based on a threshold value larger than a threshold value for comparing a difference between the border pixel and a pixel other than the adjacent pixel. The border pixel and the adjacent pixel respectively constitute borders of different blocks, and luminance may be largely varied. Thus, it is better to set a threshold value for comparison larger than a threshold value for comparing the other pixels to perform filter processing in a relatively positive manner.

Moreover, in the image processor according to claim 5 or 6, an image processor of claim 7 of the present invention is characterized in that a threshold value for comparing a difference between the border pixel and the adjacent pixel being adjacent to the border pixel is set at a value equivalent to "$2^{n-3}$" or an approximate value while a pixel has a maximum value of "$2^n-1$" ($n \geq 4$), and a threshold value for comparing a difference between the border pixel and a pixel other then the adjacent pixel is set at a value equivalent to "$2^{n-4}$" or an approximate value.

In such a configuration, when a difference between the border pixel and the adjacent pixel is compared, a threshold value is set at a value equivalent to "$2^{n-3}$" or an approximate value while a pixel has a maximum value of "$2^n-1$", and comparison is made based on the threshold value. Here, when the threshold value is set larger than a value equivalent to "$2^{n-3}$" or an approximate value, filter processing is performed even though it is not necessary. Thus, processing load increases and the speed of filter processing cannot be increased. Conversely, when the threshold value is set smaller than a value equivalent to "$2^{n-3}$" or an approximate value, filter processing is not performed even though it is necessary. Thus, effective screen effect cannot be expected.

Moreover, when a difference between the border pixel and a pixel other then the adjacent pixel is compared, a threshold value is set at a value equivalent to "$2^{n-4}$" or an approximate value while a pixel has a maximum value of "$2^{n-1}$", and comparison is made based on the threshold value. Here, when the threshold value is set larger than a value equivalent to "$2^{n-4}$" or an approximate value, filter processing is performed even though it is not necessary. Thus, processing load increases and the speed of filter processing cannot be increased. Conversely, when the threshold value is set smaller than a value equivalent to "$2^{n-4}$" or an approximate value, filter processing is not performed even though it is necessary. Thus, effective screen effect cannot be expected.

Besides, in the image processor according to any one of claims 5 to 7, an image processor according to claim 8 of the present invention performs the filter processing such that judgment is made on whether the filter arithmetic operation should be performed on a pixel, in a direction of sequentially moving away from the border, the judgment being started from an adjacent pixel being adjacent to the border pixel, and when it is judged that the filter arithmetic operation should not be performed on a pixel, the filter arithmetic operation is not performed on the pixel and pixels in the later stages.

In such a configuration, judgment on whether the filter arithmetic operation should be performed on a pixel is made in a direction of sequentially moving away from the border, the judgment being started from an adjacent pixel being adjacent to the border pixel. And then, in the judgment, when it is judged that filter arithmetic operation should not be performed on a pixel, filter arithmetic operation is not performed on the pixel and pixels in the later stages.

Originally, in judgment on whether filter arithmetic operation should be performed on a pixel, it is necessary to judge whether a difference between pixels exceeds a threshold value, the pixels ranging from one pixel to a border pixel. For example, when four pixels exist between a target pixel and a border pixel (including the target pixel and the border pixel), judgment needs to be made for three times. However, when judgment is made in the above order, except for judgment on the target pixel and the border pixel, judgment has been already made in judgment on pixels of the previous stage. Hence, it is possible to omit judgment on the pixels of the later stage. Therefore, when four pixels exist between the farthest pixel and the border pixel of the target pixels, judgment for three times is enough at the maximum while judgment normally needs to be made for 3! times over a pixel array.

Furthermore, in the image processor according to any one of claims 1 to 8, an image processor according to claim 9 of the present invention comprises memory means for work which is availably connected to image memory means for storing the expanded image and has a sufficient storage capacity for storing data of all pixels ranging from one pixel, which is the farthest from a border in a block among pixels of a pixel array intersecting the border between adjacent blocks, to a border pixel, which is in the same pixel array and is positioned at the border in an adjacent block, the filter processing is performed such that data of all pixels ranging from one pixel to the border pixel in the pixel array is read from the image memory means to the memory means for work in an integrated manner, and the filter arithmetic operation is performed based on the pixel data of the memory means for work.

In such a configuration, according to the filter processing, data of all pixels ranging from one pixel to the border pixel in the pixel array is read from the image memory means to the memory means for work in an integrated manner, and the filter arithmetic operation is performed based on the pixel data of the memory means for work.

Here, the memory means for work stores pixel data by any means at any time. Pixel data may be stored in advance, or pixel data may be stored by input and so on from the outside during an operation of the processor without storing pixel data in advance. This holds true for the case where an expanded image is stored in the image memory means. Hereinafter, this will hold true for an image processor of claim 19, an image processing program of claim 27, and an image processing method of claim 35.

Furthermore, in the image processor according to any one of claims 1 to 9, an image processor according to claim 10 of the present invention performs the filter processing such that as to a pixel array intersecting a border between adjacent blocks, when pixel values on one side of the border are referred to as $v_4$, $v_3$, and $v_2$ in the order of being close to the border and pixel values on the opposite side of the border are referred to as $v_5$, $v_6$, and $v_7$ in the order of being close to the border, pixel values $v_2'$ to $v_4'$ after filtering are computed by filter arithmetic equations of "$v_2'=(v_2+v_5)/2+(v_2-v_5)/4$", "$v_3'=(v_3+v_5)/2+(v_3-v_5)/8$", and "$v_4'=(v_4+v_5)/2$", and pixel values $v_5'$ to $v_7'$ after filtering are computed by the filter arithmetic equations by using $v_4$ to $v_7$ as $v_5$, $v_4$, $v_3$, and $v_2$.

In such a configuration, in the filter processing, pixel values $v_2'$ to $v_4'$ after filtering are computed by the filter arithmetic equations as to a pixel array intersecting the border. Further, pixel values $v_5'$ to $v_7'$ after filtering are computed by filter arithmetic equations by using $v_4$ to $v_7$ as $v_5$, $v_4$, $v_3$, and $v_2$.

Additionally, in the image processor according to any one of claims 1 to 9, an image processor according to claim 11 of the present invention performs the filter processing such that as to a pixel array intersecting a border between adjacent blocks, when pixel values on one side of the border are referred to as $v_4$, $v_3$, and $v_2$ in the order of being close to the border and pixel values on the opposite side of the border are referred to as $v_5$, $v_6$, and $v_7$ in the order of being close to the border, pixel values $v_5'$ to $v_7'$ after filtering are computed by filter arithmetic equations of "$v_5'=(v_5+v_4)/2+(v_5-v_4)/8$", "$v_6'=(v_6+v_4)/2+(v_6-v_4)/4$", and "$v_7'=(v_7-(v_7-v_4)/8$", and pixel values $v_2'$ to $v_4'$ after filtering are computed by the filter arithmetic equations by using $v_2$ to $v_5$ as $v_7$, $v_6$, $v_5$, and $v_4$.

In such a configuration, in the filter processing, pixel values $v_5'$ to $v_7'$ after filtering are computed by the above filter arithmetic equations. Further, pixel values $v_2'$ to $v_4'$ after filtering are computed by the filter arithmetic equations by using $v_2$ to $v_5$ as $v_7$, $v_6$, $v_5$, and $v_4$.

Moreover, in the image processor according to any one of claims 1 to 11, an image processor according to claim 12 of the present invention performs the filter processing such that the filter arithmetic operation is performed on one of a pixel array in a horizontal direction and a pixel array in a vertical direction in the block, and then, the filter arithmetic operation is performed on the other.

In such a configuration, according to the filter processing, the filter arithmetic operation is performed on one of a pixel array in a horizontal direction and a pixel array in a vertical direction in the block, and then, the filter arithmetic operation is performed on the other.

Additionally, in the image processor according to any one of claims 1 to 12, an image processor according to claim 13 of the present invention performs the quantization as processing for roughly quantizing high-frequency components of the results of the discrete cosine transform, and performs the filter processing such that filter arithmetic operation is performed on one pixel based on a value of a target pixel to be computed and values of adjacent pixels being adjacent to the target pixel, and in the filter arithmetic operation, when a difference between one pixel and the target pixel of the adjacent pixels exceeds a threshold value, the value of the target pixel is used instead of the value of one pixel.

In such a configuration, according to the filter processing, filter arithmetic operation is performed on one pixel based on a value of the target value and values of the adjacent pixels. And then, in the filter arithmetic operation, when a difference between one pixel and the target pixel of the adjacent pixels exceeds a threshold value, the value of the target pixel is used instead of the value of one pixel.

In addition, in the image processor according to claim 13, an image processor according to claim 14 of the present invention performs the filter processing using a constant value as the threshold value.

In such a configuration, when a difference between one pixel and the target pixel of the adjacent pixels is compared, a constant value is used as a threshold value and the comparison is made based on the threshold value. Here, since the threshold value is a constant value, it is not necessary to compute a threshold value in the filter processing.

Besides, in the image processor according to claim 14, an image processor according to claim 15 of the present invention performs the filter processing such that the threshold value is set at a value equivalent to "$2^{n-4}$" or an approximate value while the pixel has a maximum value of "$2^n-1$" ($n \geq 4$).

In such a configuration, when a difference between one pixel and the target pixel of the adjacent pixels is compared, the threshold value is set at a value equivalent to "$2^{n-4}$" or an approximate value while the pixel has a maximum value of "$2^n-1$", and the comparison is made based on the threshold value. Here, when the threshold value is set larger than a value equivalent to "$2^{n-4}$" or an approximate value, a value of the adjacent pixel is not replaced with a value of the target pixel even though the value needs to be replaced. Thus, effective screen effect cannot be expected. Conversely, when the threshold value is set smaller than a value equivalent to "$2^{n-4}$" or an approximate value, a value of the adjacent pixel is replaced with a value of the target pixel even though the value does not need to be replaced. Thus, effective screen effect cannot be expected.

Furthermore, in the image processor according to any one of claims 1 to 15, an image processor according to claim 16 of the present invention performs the quantization as processing for roughly quantizing high-frequency components of the results of the discrete cosine transform, and performs the filter processing such that filter arithmetic operation is performed on one pixel based on a value of a target pixel to be computed and values of four, two, or one adjacent pixel being adjacent to the target pixel.

In such a configuration, according to the filter processing, filter arithmetic operation is performed on one pixel based on a value of a target pixel and values of four, two, or one adjacent pixel being adjacent to the target pixel.

Further, in the image processor according to any one of claims 1 to 16, an image processor according to claim 17 of the present invention performs the quantization as processing for roughly quantizing high-frequency components of the results of the discrete cosine transform, and performs the filter processing such that filter arithmetic operation is performed on one pixel by dividing a value of the target pixel to be computed by a predetermined value, dividing a value of an adjacent pixel being adjacent to the target pixel by the predetermined value, and adding the division results.

In such a configuration, according to the filter processing, the filter arithmetic operation is performed on one pixel by dividing a value of the target pixel by the predetermined value, dividing a value of an adjacent pixel by the predetermined value, and adding the division results.

Moreover, an image processor according to claim 18 of the present invention is a processor for performing filter processing on an expanded image when or after the image is expanded in the unit of predetermined blocks based on compressed image data compressed by image compression, in which discrete cosine transform and quantization are performed in the unit of blocks, and the filter processing is performed such that filter arithmetic operation is performed on one of pixels in a pixel array intersecting a border between adjacent blocks when no difference between pixels exceeds a threshold value, the pixels ranging from one pixel to a border pixel which is in the same pixel array and is positioned on the border in the adjacent block, and a constant value is used as the threshold value.

In such a configuration, the filter processing is performed such that filter arithmetic operation is performed on one pixel when no difference between pixels exceeds a threshold value, the pixels ranging from one pixel to the border pixel which is in the same pixel array intersecting the border in the adjacent block. Here, since the threshold value is a constant value, it is not necessary to compute a threshold value in the filter processing.

Moreover, an image processor according to claim 19 of the present invention is a processor for performing filter processing on an expanded image when or after the image is expanded in the unit of predetermined blocks based on compressed image data compressed by image compression, in which discrete cosine transform and quantization are performed in the unit of blocks, the processor comprising memory means for work which is availably connected to image memory means for storing the expanded image and has a sufficient storage capacity for storing data of all pixels ranging from one pixel, which is the farthest from a border in a block among pixels of a pixel array intersecting the border between adjacent blocks, to a border pixel, which is in the same pixel array and is positioned on the border in an adjacent block. The filter processing is performed such that data of all pixels from one pixel to the border pixel in the pixel array is read from the image memory means to the memory means for work in an integrated manner, and the filter arithmetic operation is performed based on the pixel data of the memory means for work.

In such a configuration, according to the filter processing, data of all pixels from one pixel to the border pixel in the pixel array is read from the image memory means to the memory means for work in an integrated manner, and the filter arithmetic operation is performed based on the pixel data of the memory means for work.

Additionally, an image processor according to claim 20 of the present invention is a processor for performing filter processing on an expanded image when or after the image is expanded in the unit of predetermined blocks based on compressed image data compressed by image compression, in which discrete cosine transform and quantization are performed in the unit of blocks, and the filter processing is performed such that as to a pixel array intersecting a border between adjacent blocks, when pixel values on one side of the border is referred to as $v_4$, $v_3$, and $v_2$ in the order of being close to the border and pixel values on the opposite side of the border are referred to as $v_5$, $v_6$, and $v_7$ in the order of being close to the border, pixel values $v_2'$ to $v_4'$ after filtering are computed by filter arithmetic equations of "$v_2'=(v_2+v_5)/2+(v_2-v_5)/4$", "$v_3'=(v_3+v_5)/2+(v_3-v_5)/8$", and "$v_4'=(v_4+v_5)/2$", and pixel values $v_5'$ to $v_7'$ after filtering are computed by the filter arithmetic equations by using $v_4$ to $v_7$ as $v_5$, $v_4$, $v_3$, and $v_2$.

In such a configuration, according to the filter processing, pixel values $v_2'$ to $v_4'$ after filtering are computed by the filter arithmetic equations as to a pixel array intersecting the border. Further, pixel values $v_5'$ to $v_7'$ after filtering are computed by filter arithmetic equations by using $v_4$ to $v_7$ as $v_5$, $v_4$, $v_3$, and $v_2$.

Additionally, an image processor according to claim 21 of the present invention is a processor for performing filter processing on an expanded image when or after the image is expanded in the unit of predetermined blocks based on compressed image data compressed by image compression, in which discrete cosine transform and quantization are performed in the unit of blocks, and the filter processing is performed such that as to a pixel array intersecting a border between adjacent blocks, when pixel values on one side of the border are referred to as $v_4$, $v_3$, and $v_2$ in the order of being close to the border and pixel values on the opposite side of the border are referred to as $v_5$, $v_6$, and $v_7$ in the order of being close to the border, pixel values $v_5'$ to $v_7'$ after filtering are computed by filter arithmetic equations of "$v_5'=(v_5+v_4)/2+(v_5-v_4)/8$", "$v_6'=(v_6+v_4)/2+(v_6-v_4)/4$", and "$v_7'=(v_7-(v_7-v_4)/8$", and pixel values $v_2'$ to $v_4'$ after filtering are computed by the filter arithmetic equations by using $v_2$ to $v_5$ as $v_7$, $v_6$, $v_5$, and $v_4$.

In such a configuration, according to the filter processing, pixel values $v_5'$ to $v_7'$ after filtering are computed by the filter arithmetic equations as to the pixel array intersecting the border. Further, pixel values $v_2'$ to $v_4'$ after filtering are computed by the filter arithmetic equations by using $v_2$ to $v_5$ as $v_7$, $v_6$, $v_5$, and $v_4$.

Moreover, an image processor according to claim 22 of the present invention is a processor for performing filter processing on an expanded image when or after the image is expanded based on compressed image data compressed by image compression, in which discrete cosine transform and quantization for roughly quantizing high-frequency components of the results of the discrete cosine transform are performed, and the filter processing is performed such that filter arithmetic operation is performed on one pixel based on a value of a target pixel to be computed and values of adjacent pixels being adjacent to the target pixel, and in the filter arithmetic operation, when a difference between one pixel and the target pixel of the adjacent pixels exceeds a threshold value, a value of the target pixel is used instead of a value of one pixel.

In such a configuration, according to the filter processing, filter arithmetic operation is performed on one pixel based on a value of the target value and values of the adjacent pixels. And then, in the filter arithmetic operation, when a difference between one pixel and the target pixel of the adjacent pixels exceeds a threshold value, a value of the target pixel is used instead of a value of one pixel.

Moreover, an image processor according to claim 23 of the present invention is a processor for performing filter processing on an expanded image when or after the image is expanded based on compressed image data compressed by image compression, in which discrete cosine transform and quantization for roughly quantizing high-frequency components of the results of the discrete cosine transform are performed, and the filter processing is performed such that filter arithmetic operation is performed on one pixel based on a value of a target pixel to be computed and values of four, two, or one adjacent pixel being adjacent to the target pixel.

In such a configuration, according to the filter processing, filter arithmetic operation is performed on one pixel based on a value of a target pixel to be computed and values of four, two, or one adjacent pixel being adjacent to the target pixel.

In addition, an image processor according to claim 24 of the present invention is a processor for performing filter processing on an expanded image when or after the image is expanded based on compressed image data compressed by image compression, in which discrete cosine transform and quantization for roughly quantizing high-frequency components of the results of the discrete cosine transform are performed, and the filter processing is performed such that filter arithmetic operation is performed on one pixel by dividing a value of the target pixel to be computed by a predetermined value, dividing a value of an adjacent pixel being adjacent to the target pixel by the predetermined value, and adding the division results.

In such a configuration, according to the filter processing, the filter arithmetic operation is performed on one pixel by dividing a value of the target pixel by the predetermined value, dividing a value of an adjacent pixel by the predetermined value, and adding the division results.

Meanwhile, in order to attain the above-described objective, an image processing program according to claim 25 of the present invention is a program for causing a computer to perform filter processing on an expanded image when or after the image is expanded in the unit of predetermined blocks based on compressed image data compressed by image compression, in which discrete cosine transform and quantization are performed in the unit of blocks, and the filter processing is performed such that filter arithmetic operation is performed on one pixel in the block only based on a value of the pixel and a value of any one of pixels in an adjacent block.

In such a configuration, when the program is read by the computer and the processing is performed by the computer, the same effect is obtained as the image processor of claim 1.

Further, an image processing program according to claim 26 of the present invention is a program for causing a computer to perform filter processing on an expanded image when or after the image is expanded in the unit of predetermined blocks based on compressed image data compressed by image compression, in which discrete cosine transform and quantization are performed in the unit of blocks, and the filter processing is performed such that filter arithmetic operation is performed on one of pixels in a pixel array intersecting a border between adjacent blocks when no difference between pixels exceeds a threshold value, the pixels ranging from one pixel to a border pixel positioned on the border in the same pixel array in the adjacent block, and a constant value is used as the threshold value.

In such a configuration, when the program is read by the computer and the processing is performed by the computer according to the read program, the same effect can be obtained as the image processor of claim 18.

Moreover, an image processing program according to claim 27 of the present invention is a program for causing a computer to perform filter processing on an expanded image when or after the image is expanded in the unit of predetermined blocks based on compressed image data compressed by image compression, in which discrete cosine transform and quantization are performed in the unit of blocks, the computer comprising memory means for work which is availably connected to image memory means for storing the expanded image and has a sufficient storage capacity for storing data of all pixels ranging from a pixel, which is the farthest from a border in a block among pixels of a pixel array intersecting the border between adjacent blocks, to a border pixel, which is in the same pixel array and is positioned on the border in an adjacent block, the filter processing is performed such that data of all pixels ranging from one pixel to the border pixel in the pixel array is read from the image memory means to the memory means for work in an integrated manner, and the filter arithmetic operation is performed based on the pixel data of the memory means for work.

In such a configuration, when the program is read by the computer and the processing is performed by the computer according to the read program, the same effect can be obtained as the image processor of claim 19.

Besides, an image processing program according to claim 28 of the present invention is a program for causing a computer to perform filter processing on an expanded image when or after the image is expanded in the unit of predetermined blocks based on compressed image data compressed by image compression, in which discrete cosine transform and quantization are performed in the unit of blocks, the filter processing is performed such that as to a pixel array intersecting a border between adjacent blocks, when pixel values on one side of the border are referred to as $v_4$, $v_3$, and $v_2$ in the order of being close to the border and pixel values on the opposite side of the border are referred to as $v_5$, $v_6$, and $v_7$ in the order of being close to the border, pixel values $v_2'$ to $v_4'$ after filtering are computed by filter arithmetic equations of "$v_2'=(v_2+v_5)/2+(v_2-v_5)/4$", "$v_3'=(v_3+v_5)/2+(v_3-v_5)/8$", and "$v_4'=(v_4+v_5)/2$", and pixel values $v_5'$ to $v_7'$ after filtering are computed by the filter arithmetic equations by using $v_4$ to $v_7$ as $v_5$, $v_4$, $v_3$, and $v_2$.

In such a configuration, when the program is read by the computer and the processing is performed by the computer according to the read program, the same effect can be obtained as the image processor of claim 20.

In addition, an image processing program according to claim 29 of the present invention is a program for causing a computer to perform filter processing on an expanded image when or after the image is expanded in the unit of predetermined blocks based on compressed image data compressed by image compression, in which discrete cosine transform and quantization are performed in the unit of blocks, the filter processing is performed such that as to a pixel array intersecting a border between adjacent blocks, when pixel values on one side of the border are referred to as $v_4$, $v_3$, and $v_2$ in the order of being close to the border and pixel values on the opposite side of the border are referred to as $v_5$, $v_6$, and $v_7$ in the order of being close to the border, pixel values $v_5'$ to $v_7'$ after filtering are computed by filter arithmetic equations of "$v_5'=(v_5+v_4)/2+(v_5-v_4)/8$", "$v_6'=(v_6+v_4)/2+(v_6-v_4)/4$", and "$v_7'=(v_7-(v_7-v_4)/8$", and pixel values $v_2'$ to $v_4'$ after filtering are computed by the filter arithmetic equations by using $v_2$ to $v_5$ as $v_7$, $v_6$, $v_5$, and $v_4$.

In such a configuration, when the program is read by the computer and the processing is performed by the computer according to the read program, the same effect can be obtained as the image processor of claim 21.

Moreover, an image processing program according to claim 30 of the present invention is a program for causing a computer to perform filter processing on an expanded image when or after the image is expanded based on compressed image data compressed by image compression, in which discrete cosine transform and quantization for roughly quantizing high-frequency components of the results of the discrete cosine transform are performed, the filter processing is performed such that filter arithmetic operation is performed on one pixel based on a value of a target pixel to be computed and values of adjacent pixels being adjacent to the target pixel, and in the filter arithmetic operation, when a difference between one pixel and the target pixel of the adjacent pixels exceeds a threshold value, a value of the target pixel is used instead of a value of one pixel.

In such a configuration, when the program is read by the computer and the processing is performed by the computer according to the read program, the same effect can be obtained as the image processor of claim 22.

Also, an image processing program according to claim 31 of the present invention is a program for causing a computer to perform filter processing on an expanded image when or after the image is expanded based on compressed image data compressed by image compression, in which discrete cosine transform and quantization for roughly quantizing high-frequency components of the results of the discrete cosine transform are performed, and the filter processing is performed such that filter arithmetic operation is performed on one pixel based on a value of a target pixel to be computed and values of four, two, or one adjacent pixel being adjacent to the target pixel.

In such a configuration, when the program is read by the computer and the processing is performed by the computer according to the read program, the same effect can be obtained as the image processor of claim 23.

Also, an image processing program according to claim 32 of the present invention is a program for causing a computer to perform filter processing on an expanded image when or after the image is expanded based on compressed image data compressed by image compression, in which discrete cosine transform and quantization for roughly quantizing high-frequency components of the results of the discrete cosine transform are performed, and the filter processing is performed such that filter arithmetic operation is performed on one pixel by dividing a value of the target pixel to be computed by a predetermined value, dividing a value of an adjacent pixel being adjacent to the target pixel by the predetermined value, and adding the division results.

In such a configuration, when the program is read by the computer and the processing is performed by the computer according to the read program, the same effect can be obtained as the image processor of claim 24.

Meanwhile, in order to attain the above-described objective, an image processing method according to claim 33 of the present invention is a method for performing filter processing on an expanded image when or after the image is expanded in the unit of predetermined blocks based on compressed image data compressed by image compression, in which discrete cosine transform and quantization are performed in the unit of blocks, and the filter processing is performed such that filter arithmetic operation is performed on one pixel in the block only based on a value of the pixel and a value of any one of pixels in an adjacent block.

Further, an image processing method according to claim 34 of the present invention is a method for performing filter processing on an expanded image when or after the image is expanded in the unit of predetermined blocks based on compressed image data compressed by image compression, in which discrete cosine transform and quantization are performed in the unit of blocks, the filter processing is performed such that filter arithmetic operation is performed on one of pixels in a pixel array intersecting a border between adjacent blocks when no difference between pixels exceeds a threshold value, the pixels ranging from one pixel to a border pixel positioned on the border in the same pixel array of the adjacent block, and a constant value is used as the threshold value.

Moreover, an image processing method according to claim 35 of the present invention is a method for performing filter processing on an expanded image when or after the image is expanded in the unit of predetermined blocks based on compressed image data compressed by image compression, in which discrete cosine transform and quantization are performed in the unit of blocks, memory means for work is availably connected to image memory means for storing the expanded image, the filter processing is performed such that regarding all pixels ranging from one pixel to a border pixel in a pixel array, data is read from the image memory means to the memory means for work in an integrated manner, the memory means for work having a sufficient storage capacity for storing data of all pixels ranging from a pixel, which is the farthest from a border in a block among pixels of a pixel array intersecting the border between adjacent blocks, to a border pixel, which is in the same pixel array and is positioned on the border in the adjacent block, and the filter arithmetic operation is performed based on the pixel data of the memory means for work.

Besides, an image processing method according to claim 36 of the present invention is a method for performing filter processing on an expanded image when or after the image is expanded in the unit of predetermined blocks based on compressed image data compressed by image compression, in which discrete cosine transform and quantization are performed in the unit of blocks, the filter processing is performed such that as to a pixel array intersecting a border between adjacent blocks, when pixel values on one side of the border are referred to as $v_4$, $v_3$, and $v_2$ in the order of being close to the border and pixel values on the opposite side of the border are referred to as $v_5$, $v_6$, and $v_7$ in the order of being close to the border pixel values, $v_2'$ to $v_4'$ after filtering are computed by filter arithmetic equations of "$v_2'=(v_2+v_5)/2+(v_2-v_5)/4$", "$v_3'=(v_3+v_5)/2+(v_3-v_5)/8$", and "$v_4'=(v_4+v_5)/2$", and pixel values $v_5'$ to $v_7'$ after filtering are computed by the filter arithmetic equations by using $v_4$ to $v_7$ as $v_5$, $v_4$, $v_3$, and $v_2$.

Also, an image processing method according to claim 37 of the present invention is a method for performing filter processing on an expanded image when or after the image is expanded in the unit of predetermined blocks based on compressed image data compressed by image compression, in which discrete cosine transform and quantization are performed in the unit of blocks, the filter processing is performed such that as to a pixel array intersecting a border between adjacent blocks, when pixel values on one side of the border are referred to as $v_4$, $v_3$, and $v_2$ in the order of being close to the border and pixel values on the opposite side of the border are referred to as $v_5$, $v_6$, and $v_7$ in the order of being close to the border pixel values, $v_5'$ to $v_7'$ after filtering are computed by filter arithmetic equations of "$v_5'=(v_5+v_4)/2+(v_5-v_4)/8$", "$v_6'=(v_6+v_4)/2+(v_6-v_4)/4$", and "$v_7'=(v_7-(v_7-v_4)/8$", and pixel values $v_2'$ to $v_4'$ after filtering are computed by the filter arithmetic equations by using $v_2$ to $v_5$ as $v_7$, $v_6$, $v_5$, and $v_4$.

Moreover, an image processing method according to claim 38 of the present invention is a method for performing filter processing on an expanded image when or after the image is expanded based on compressed image data compressed by image compression, in which discrete cosine transform and quantization for roughly quantizing high-frequency components of the results of the discrete cosine transform are performed, and the filter processing is performed such that filter arithmetic operation is performed on one pixel based on a value of a target pixel to be computed and values of adjacent pixels being adjacent to the target pixel, and in the filter arithmetic operation, when a difference between one pixel and the target pixel of the adjacent pixels exceeds a threshold value, a value of the target pixel is used instead of a value of one pixel.

Additionally, an image processing method according to claim 39 of the present invention is a method for performing filter processing on an expanded image when or after the image is expanded based on compressed image data compressed by image compression, in which discrete cosine transform and quantization for roughly quantizing high-frequency components of the results of the discrete cosine transform are performed, and the filter processing is performed such that filter arithmetic operation is performed on one pixel based on a value of a target pixel to be computed and values of four, two, or one adjacent pixel being adjacent to the target pixel.

Additionally, an image processing method according to claim 40 of the present invention is a method for performing filter processing on an expanded image when or after the image is expanded based on compressed image data compressed by image compression, in which discrete cosine transform and quantization for roughly quantizing high-frequency components of the results of the discrete cosine transform are performed, and the filter processing is performed such that filter arithmetic operation is performed on one pixel by dividing a value of the target pixel to be computed by a predetermined value, dividing a value of an adjacent pixel being adjacent to the target pixel by the predetermined value, and adding the division results.

BRIEF DESCRIPTION OF THE DRAWINGS

FIG. 3(*a*)–(*b*) are bar graphs showing the value of each of the pixels of the pixel arrays PG1 and PG2;

FIG. 17(*a*)–(*b*) is a bar graph showing the value of each pixel of the pixel array PG1;

DETAILED DESCRIPTION OF THE PREFERRED EMBODIMENTS

Hereinafter, First Embodiment of the present invention will be discussed in accordance with the accompanied drawings. FIGS. 1 to 8 are drawings showing an image processor and an image processing program, and an image processing method according to First Embodiment of the present invention.

Figure 1:
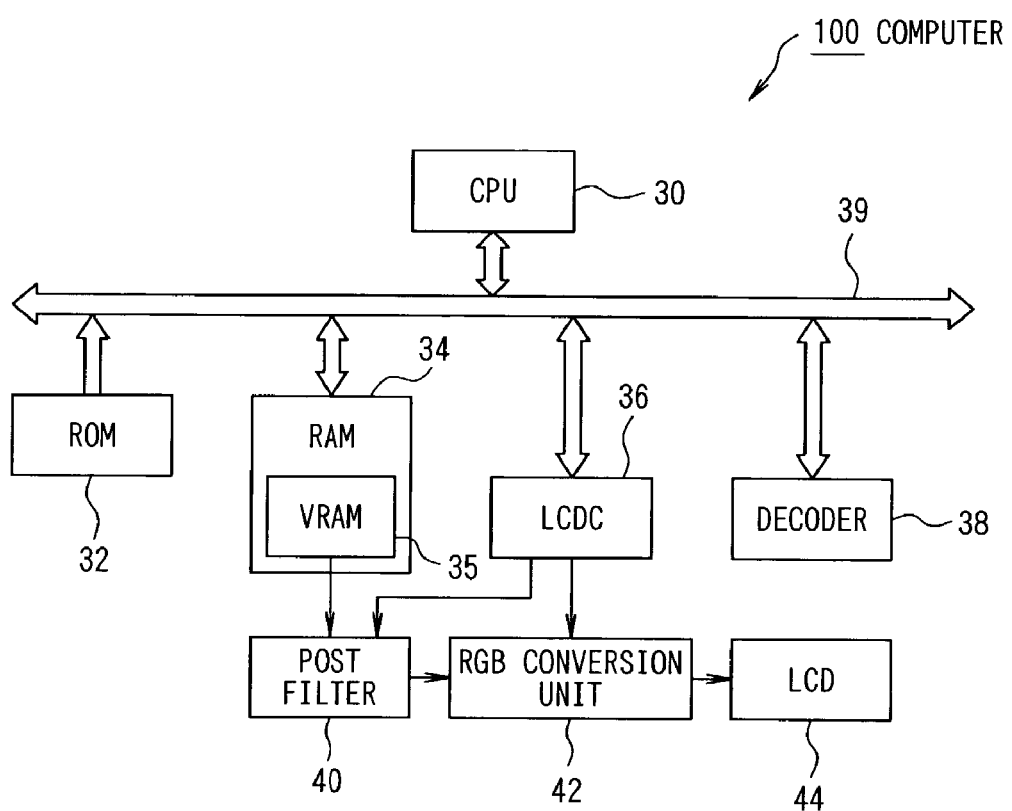
FIG. 1 is a block diagram of the configuration of the computer system to which the present invention is applied.

In the present embodiment, the image processor and the image processing program, and the image processing method of the present invention are applied to the following case: as shown in FIG. 1, in a computer 100, when moving image data compressed in MPEG format is decoded by an OS (Operating System), which operates in a multitasking manner, to reproduce a moving image, filter processing for reducing block noise and filter processing for reducing mosquito noise are performed on the reproduced image. Hereinafter, the former filter processing will be referred to as deblocking filter processing and the latter filter processing will be referred to as deringing filter processing.

First, the configuration of a computer system applies to the present invention will be discussed in accordance with FIG. 1. FIG. 1 is a block diagram showing the configuration of the computer system applies to the present invention.

As shown in FIG. 1, the computer 100 is constituted by a CPU 30 for controlling computations and the entire of the system according to control programs, ROM 32 for previously storing control programs and the like of the CPU 30 in a predetermined region, RAM 34 for storing data read from the ROM 32 and so on and computing results required for a computing process of the CPU 30, an LCDC 36 for converting data in a specific region of the RAM 34 to a picture signal and outputting the signal to the LCD (Liquid Crystal Display) 44, a decoder 38 for decoding moving image data, a post filter unit 40 for reading data in a specific region of the RAM 34 to perform deblocking filter processing and deringing filter processing, a RGB converting section 42 for performing color conversion on data from the post filter unit 40, and an LCD 44 for providing display based on data from the RGB conversion unit 42. And then, the CPU 30, the ROM 32, the RAM 34, the LCDC 36, and the decoder 38 are connected to one another via a bus 39, which is a signal line for transferring data, in such a manner that data can be transmitted and received.

The RAM 34 has as a specific region VRAM 35 for storing data displayed on the LCD 44. The VRAM 35 can be independently accessed by the post filter unit 40 and devices such as the CPU 30 and the like connected to the bus 39. Further, the VRAM 35 has at least two regions capable of storing image data of one screen of the LCD 44. One of the regions is used to allow the decoder 38 to expand moving image data, the other region is used to allow the post filter unit 40 to read, and these regions are alternately switched at a predetermined period.

The LCDC 36 reads data of the VRAM 35 in sequence from the leading address at a predetermined period by controlling the post filter unit 40 and the RGB conversion unit 42, and the LCDC 36 converts the read data to an image single and outputs the signal to the LCD 44. Namely, the post filter unit 40 reads data from the VRAM 35 in response to the control of the LCDC 36, performs deblocking filter processing and deringing filter processing on the read data, and outputs the data to the RGB conversion unit 42. The RGB conversion unit 42 performs RGB conversion on data from the post filter unit 40 in response to the control of the LCDC 36 and outputs the data to the LCD 44.

The decoder 38 sequentially decodes image data contained in moving image data every predetermined time T (e.g., 20 [ms]). To be specific, the decoder 38 reads moving image data compressed in MPEG format from the RAM 34 in response to a decoding start command from the CPU 30, and decodes the image data to the VRAM 35 based on the read moving image data. In the VRAM 35, image data is expanded by using image data (YUV data), which indicates a degree of color of one pixel in the LCD 44, as a unit. Moreover, in the decoder 38, IDCT (Inverse Discrete Cosine Transform) and motion compensation among decoding operations in MPEG format are performed. Besides, compression and decoding in MPEG format is the same as those of the conventional example.

Next, the configuration of the post filter unit 40 will be discussed in detail.

In the post filter unit 40, the configuration and internal processing are realized by hardware. A buffer being capable of storing image data of 17 pixels is included therein. While image data is read to the buffer from the VRAM 35, pixels are processed for each block (in the present embodiment, 64 pixels consisting of a square matrix of eight pixels in a horizontal direction and eight pixels in a vertical direction) based on the read image data. To be specific, deblocking filter processing is performed on image data read from the VRAM 35, and deringing filter processing is performed on image data which has undergone deblocking filter processing. Besides, the order of the filter processing is not particularly limited. Both types of the processing may be performed or one type of the processing may be selectively performed. When the processing is selectively performed, the selection can be made by setting software or hardware, or dynamic setting based on a reproducing speed, quality, or data capacity of an image.

Figure 2:
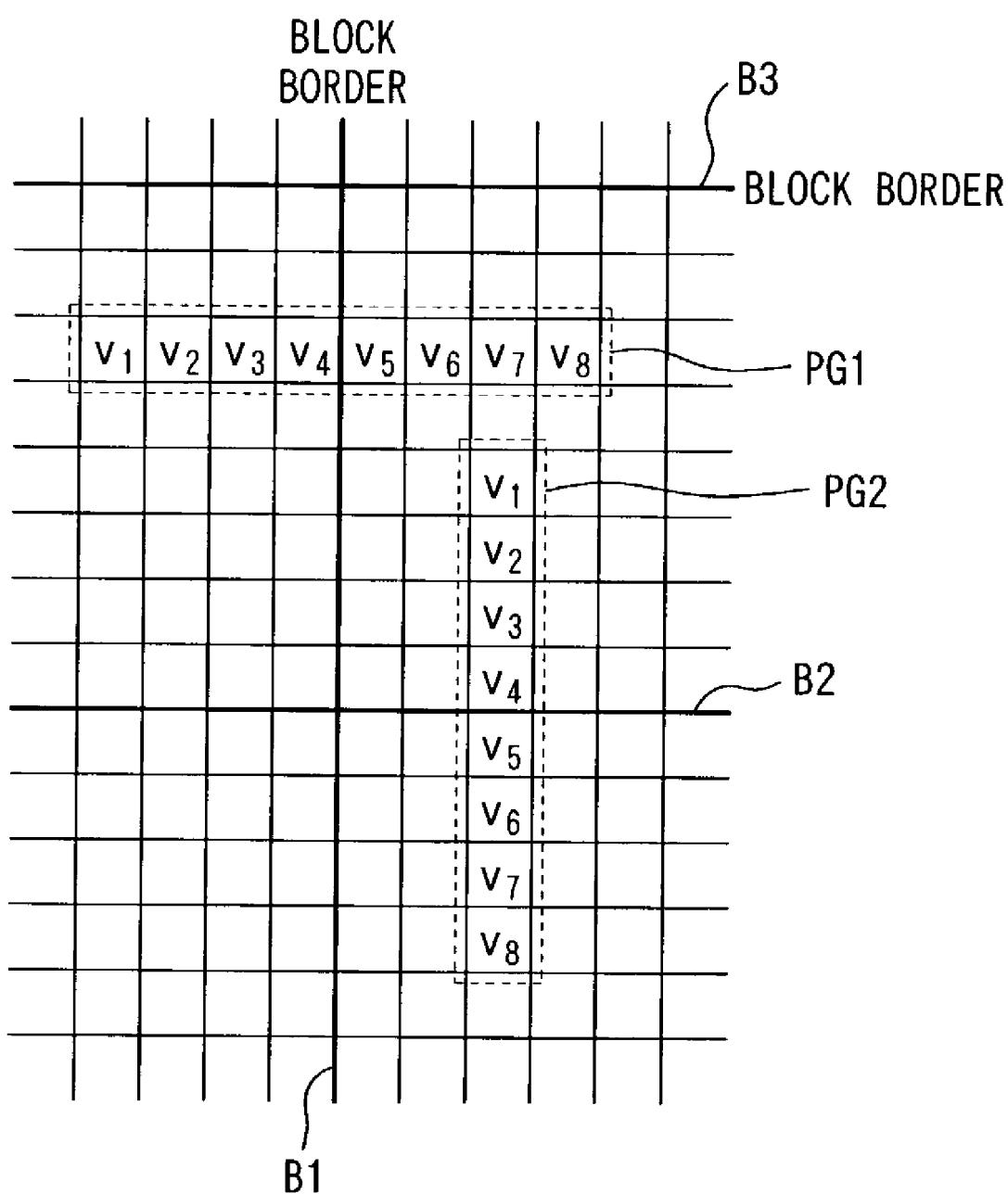
FIG. 2 shows the principle of the deblock filter processing.

The principle of deblocking filter processing of the present invention will be discussed in detail in accordance with FIGS. 2 and 3. FIGS. 2 and 3 are drawings for explaining the principle of deblocking filter processing.

In FIG. 2, as to a pixel array PG1 intersecting a border B1 between adjacent blocks, pixel values on the left of the border B1 in the drawing are referred to as $v_4$, $v_3$, $v_2$, and $v_1$ in the order of being close to the border B1, and pixel values on the right of the border B1 in the drawing are referred to as $v_5$, $v_6$, $v_7$, and $v_8$ in the order of being close to the border B1. Moreover, similarly, as to a pixel array PG2 intersecting a border B2 between adjacent blocks, pixel values on the upper part from the border B2 in the drawing are referred to as $v_4$, $v_3$, $v_2$, and $v_1$ in the order of being close to the border B2, and pixel values on the lower part from the border B2 in the drawing are referred to as $v_5$, $v_6$, $v_7$, and $v_8$ in the order of being close to the border B2.

In this case, as to the pixel arrays PG1 and PG2, pixel values $v_1'$ to $v_8'$ after deblocking filter processing are computed by arithmetic equations (1) to (8) shown below.

$$v_1' = v_1 \tag{1}$$

$$v_2' = (v_2+v_5)/2+(v_2-v_5)/4 \tag{2}$$

$$v_3' = (v_3+v_5)/2+(v_3-v_5)/8 \tag{3}$$

$$v_4' = (v_4+v_5)/2 \tag{4}$$

$$v_5' = (v_5+v_4)/2+(v_5-v_4)/8 \tag{5}$$

$$v_6' = (v_6+v_4)/2+(v_6-v_4)/4 \tag{6}$$

$$v_7' = (v_7-(v_7-v_4)/8 \tag{7}$$

$$v_8' = v_8 \tag{8}$$

The above filter arithmetic equations (1) to (8) are derived as shown below. FIG. 3 is a bar chart indicating the pixel values of the pixel arrays PG1 and PG2.

As shown in FIG. 3(A), between adjacent blocks A and B, since direct current components are removed from spatial frequency components of an image by DCT processing during compression, level differences are made by variations in average value of luminance. The level differences result in block noise. Here, in order to reduce block noise, it is considered that images of the blocks A and B are smoothly connected. An average value $V_A$ of four pixels in the block A and an average value $V_B$ of four pixels in the block B are computed by equations (9) and (10) shown below.

$$V_A=(v_1+v_2+v_3+v_4)/4 \tag{9}$$

$$V_B=(v_5+v_6+v_7+v_8)/4 \tag{10}$$

Assuming that displacement of a pixel value $v_i$ from an average values $V_A$ and $V_B$ is $\delta v_i$, the pixel value $v_1$ is represented by equations (11) and (12) shown below.

$$v_i=V_A+\delta v_i (i=1\text{--}4) \tag{11}$$

$$v_1=V_B+\delta v_i (i=5\text{--}8) \tag{12}$$

In order to smoothly connect images of the blocks A and B, it is preferable to set a difference between average values $V_A$ and $V_B$ at "0". As shown in FIG. 3(B), it is preferable to correct a pixel value $v_1$ in a step-wise manner. A difference $\Delta$ between steps is computed as shown below.

$$\Delta = (V_B - V_A)/8 \quad (13)$$

Thus, for example, a corrected value $v_5'$ of a pixel value $V_5$ can be computed by equation (14) shown below.

$$\begin{aligned} v_5' &= (V_B + V_A)/2 + \Delta + \delta v_5 \\ &= (5V_B + 3V_A)/8 + \delta v_5 \\ &= \{5(v_5 - \delta v_5) + 3(v_4 - \delta v_4)\}/8 + \delta v_5 \\ &= \{5v_5 + 3v_4 + 3(\delta v_5 - \delta v_4)\}/8 \end{aligned} \quad (14)$$

In order to compute a correct value, computation needs to be performed according to the above equation (14). In the above equation (14), $(\delta v_5 - \delta v_4)$ is assumed to be small and is omitted, and the following approximate expression (15) is obtained.

$$v_5' = 5v_5 + 3v_4/8 \quad (15)$$

Further, similarly in the other pixels in the block B, corrected values $v_6'$ to $v_8'$ can be computed by equations (16) to (18) shown below.

$$\begin{aligned} v_6' &= (V_B + V_A)/2 + 2\Delta + \delta v_6 \\ &= \{6v_6 + 2v_4 + 2(\delta v_6 - \delta v_4)\}/8 \end{aligned} \quad (16)$$

$$\begin{aligned} v_7' &= (V_B + V_A)/2 + 3\Delta + \delta v_7 \\ &= \{7v_7 + v_4 + (\delta v_7 - \delta v_4)\}/8 \end{aligned} \quad (17)$$

$$\begin{aligned} v_8' &= (V_B + V_A)/2 + 4\Delta + \delta v_8 \\ &= v_8 \end{aligned} \quad (18)$$

Hence, the following approximate expressions (19) and (20) are obtained.

$$v_6' = (3v_6 + v_4)/4 \quad (19)$$

$$v_7' = (7v_7 + v_4)/8 \quad (20)$$

Moreover, as to pixels in block A, the computation is the same except that a referred pixel has a value of $v_5$. Corrected values $v_1'$ to $v_4'$ can be computed by equations (21) to (24) shown below.

$$\begin{aligned} v_1' &= (V_B + V_A)/2 - 3\Delta + \delta v_1 \\ &= \{7v_1 + v_5 + (\delta v_1 - \delta v_5)\}/8 \end{aligned} \quad (21)$$

$$\begin{aligned} v_2' &= (V_B + V_A)/2 - 2\Delta + \delta v_2 \\ &= \{6v_2 + 2v_5 + 2(\delta v_2 - \delta v_5)\}/8 \end{aligned} \quad (22)$$

$$\begin{aligned} v_3' &= (V_B + V_A)/2 - \Delta + \delta v_3 \\ &= \{5v_3 + 3v_5 + (\delta v_3 - \delta v_5)\}/8 \end{aligned} \quad (23)$$

$$\begin{aligned} v_4' &= (V_B + V_A)/2 + \delta v_4 \\ &= (v_4 + v_5 + 2\delta v_4)/2 \end{aligned} \quad (24)$$

Hence, the following approximate equations (25) to (28) are obtained.

$$v_1' = v_1 \quad (25)$$

$$v_2' = (3v_2 + v_5)/4 \quad (26)$$

$$v_3' = (5v_3 + 3v_5)/8 \quad (27)$$

$$v_4' = (v_4 + v_5)/2 \quad (28)$$

Moreover, in actual computation, since bit shift can increase the speed of processing more than division, the equations (25) to (28), (15), (19), (20), and (18) are transformed into the equations (1) to (8) before use. Such deblocking filter processing is performed on a pixel array in a horizontal direction and a pixel array in a vertical direction respectively. An arithmetic amount includes two times of addition and subtraction respectively and four times of bit shift. Bit shift does not result in a heavy load when hardware is produced. In conventional post filters, one pixel has the maximum weighted average of 7×7 pixels. Thus, the present embodiment can remarkably reduce an arithmetic amount as compared with the conventional post filters.

Figure 4:
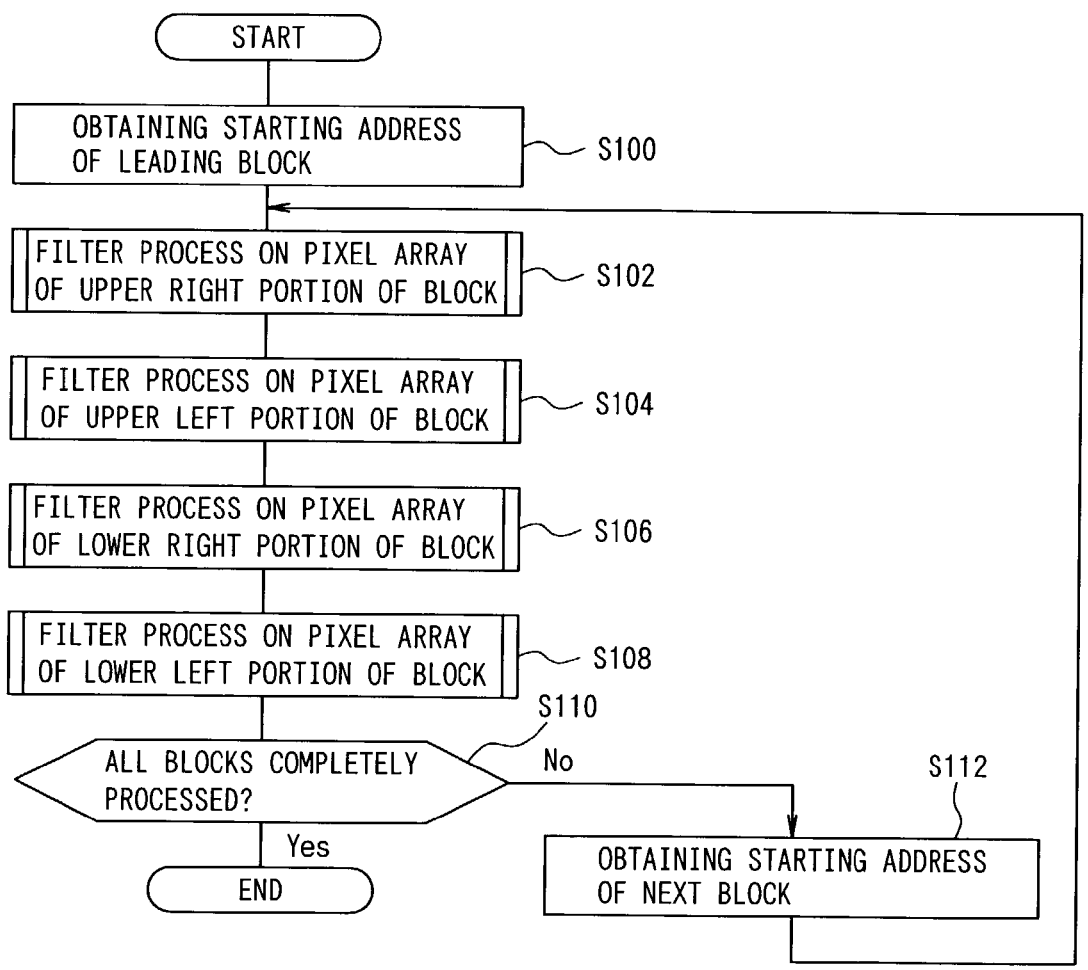
FIG. 4 is a flowchart of the deblock filter processing.

The deblock filter processing according to the present invention can be realized by the process shown in the flowchart in FIG. 4. FIG. 4 is a flowchart of the deblock filter processing.

When the deblock filter processing is performed by the post filter unit 40, control is first passed to step S100 as shown in FIG. 4.

In step S100, the starting address of the leading block is obtained from the LCDC 36, control is passed to step S102, the deblock filter processing is performed on the pixel array belonging to the area of the upper right portion of the block, control is passed to step S104, the deblock filter processing is performed on the pixel array belonging to the area of the upper left portion of the block, control is passed to step S106, the deblock filter processing is performed on the pixel array belonging to the area of the lower right portion of the block, control is passed to step S108, the deblock filter processing is performed on the pixel array belonging to the lower left portion of the block, and control is passed to step S110.

In step S110, it is determined whether or not the processes from step S102 to step S108 have been completed on all blocks forming one screen of image. If it is determined that all blocks have been completely processed (YES), then a series of processes terminates. If it is not determined so (NO), then control is passed to step S112, and the starting address of the next block is obtained from the LCDC 36, thereby passing control to step S102.

Figure 5:
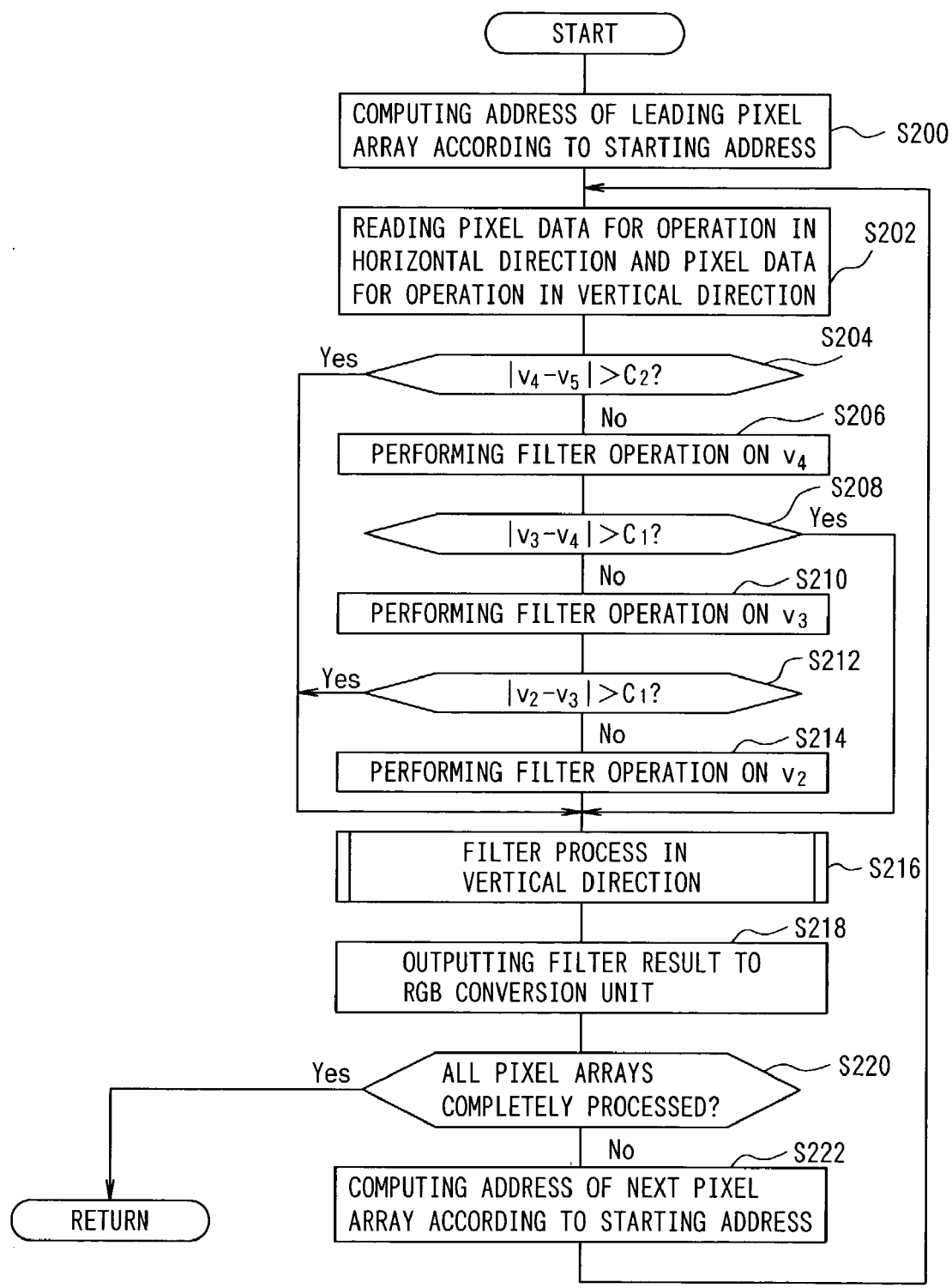
FIG. 5 is a flowchart of the filter process in step S102.

Then, the filter process in step S102 is described below in detail by referring to FIG. 5. FIG. 5 is a flowchart of the filter process in step S102.

The filter process in step S102 is the deblock filter processing performed on the pixel array belonging to the area of the upper right portion of the block. When the process is performed in step S102, control is first passed to step S200 as shown in FIG. 5.

In step S200, according to the starting address obtained in steps S100 and S112, the address of the leading pixel array in the area of the upper right portion of the block is computed, control is passed to step S202, the pixel data required in the operation in the horizontal direction and the pixel data required in the operation in the vertical direction in the pixel array on which the deblock filter processing is to be performed are collectively read to the buffer according to the computed address of the pixel array, and control is passed to step S204. For example, when the pixel array on which the deblock filter processing is to be performed is in the third row from the top, the pixel data including a total of 17 pixels, that is, the four right-to-left contiguous pixels from the upper right pixel in the block, the eight pixels two rows below the four-pixel array, the four right-to-left contiguous pixels from the lower right pixel in the above adjacent block, and the pixel two rows below the upper left pixel in the right adjacent block, is read.

Then, in steps S204, S208, and S212, it is determined whether or not the deblock filter processing is to be performed on each pixel. The determination as to whether or not the deblock filter processing is performed on each pixel is carried out based on the difference value between adjacent pixels. The deblock filter processing according to the present invention is performed based on the value of the boundary pixel between adjacent blocks. If there is a large edge to the boundary between the blocks, a blur or a shadow is generated in the outline after the correction. To avoid this, it is confirmed that there is no large difference in data up to the boundary between the blocks. If there is a stepped difference, the deblock filter processing is not performed on the related pixel. The determination is carried out on both horizontal and vertical directions.

In step S204, it is determined whether or not the absolute value of the difference between $v_4$ and $v_5$ is larger than the constant value $C_2$. If it is determined that the absolute value of the difference between $v_4$ and $v_5$ is equal to or smaller than the constant value $C_2$ (NO), then control is passed to step S206. The constant value $C_2$ is set to "32" on the assumption that the maximum value of the pixel value is "255". If the constant value $C_2$ is set larger than "32", then the filter process is performed although it is not required, thereby increasing the process load and failing in performing the filter process at a high speed. On the other hand, if it is set smaller than "32", the filter process is not performed although it is required, thereby obtaining no efficient screen effect.

In step S206, the filter arithmetic operation is performed by the equation (4) above using $v_4$ and $v_5$ to compute $v_4'$, control is passed to step S208, and it is determined whether or not the absolute value of the difference between $v_3$ and $v_4$ is larger than the constant value $C_1$. If it is determined that the absolute value of the difference between $v_3$ and $v_4$ is equal to or smaller than the constant value $C_1$ (NO), then control is passed to step S210. The constant value $C_1$ is set to "16" on the assumption that the maximum value of the pixel value is "255". If the constant value $C_1$ is set larger than 16, then the filter process is performed although it is not required, thereby increasing the process load and failing in performing the filter process at a high speed. On the other hand, if it is set smaller than "16", the filter process is not performed although it is required, thereby obtaining no efficient screen effect.

In step S210, the filter arithmetic operation is performed by the equation (3) above using $v_3$ and $v_5$ to compute $v_3'$, control is passed to step S212, and it is determined whether or not the absolute value of the difference between $v_2$ and $v_3$ is larger than the constant value $C_1$. If it is determined that the absolute value of the difference between $v_2$ and $v_3$ is equal to or smaller than the constant value $C_1$ (NO), then control is passed to step S214, the filter arithmetic operation is performed by the equation (2) above using $v_2$ and $v_5$ to compute $v_2'$, control is passed to step S216.

In step S216, the deblock filter processing is performed on the pixel array in the vertical direction. In this deblock filter processing, as described later, the operation is performed in the same manner as in steps S306 to S314.

Then, control is passed to step S218, the data of the pixels belonging to the area of the upper right portion of the block in the pixel data in the buffer is output to the RGB conversion unit 42, control is passed to step S220, and it is determined whether or not the processes in steps S204 to S218 have been completed on all pixel arrays belonging to the area of the upper right portion of the block. If the process has been completed on all pixel arrays (YES), then the series of processes terminates to resume the originating process. If it is determined that the process has not been completed an all pixel arrays (NO), then control is passed to step S222, according to the starting address obtained in steps S100 and S112, the address of the next pixel array belonging to the upper right portion of the area in the block is computed, and control is passed to step S202.

On the other hand, if it is determined in step S204 that the absolute value of the difference between $v_4$ and $v_5$ is larger than the constant value $C_2$ (YES), if it is determined in step S208 that the absolute value of the difference between $v_3$ and $v_4$ is larger than the constant value $C_1$ (YES), and if it is determined in step S212 that the absolute value of the difference between $v_2$ and $v_3$ is larger than the constant value $C_1$ (YES), then control is passed to step S216.

The process in the horizontal direction in the filter process in step S106 is similar to the processes in steps S204 to S214, and the process in the vertical direction in the filter process in step S104 is similar to the process in step S216.

Figure 6:
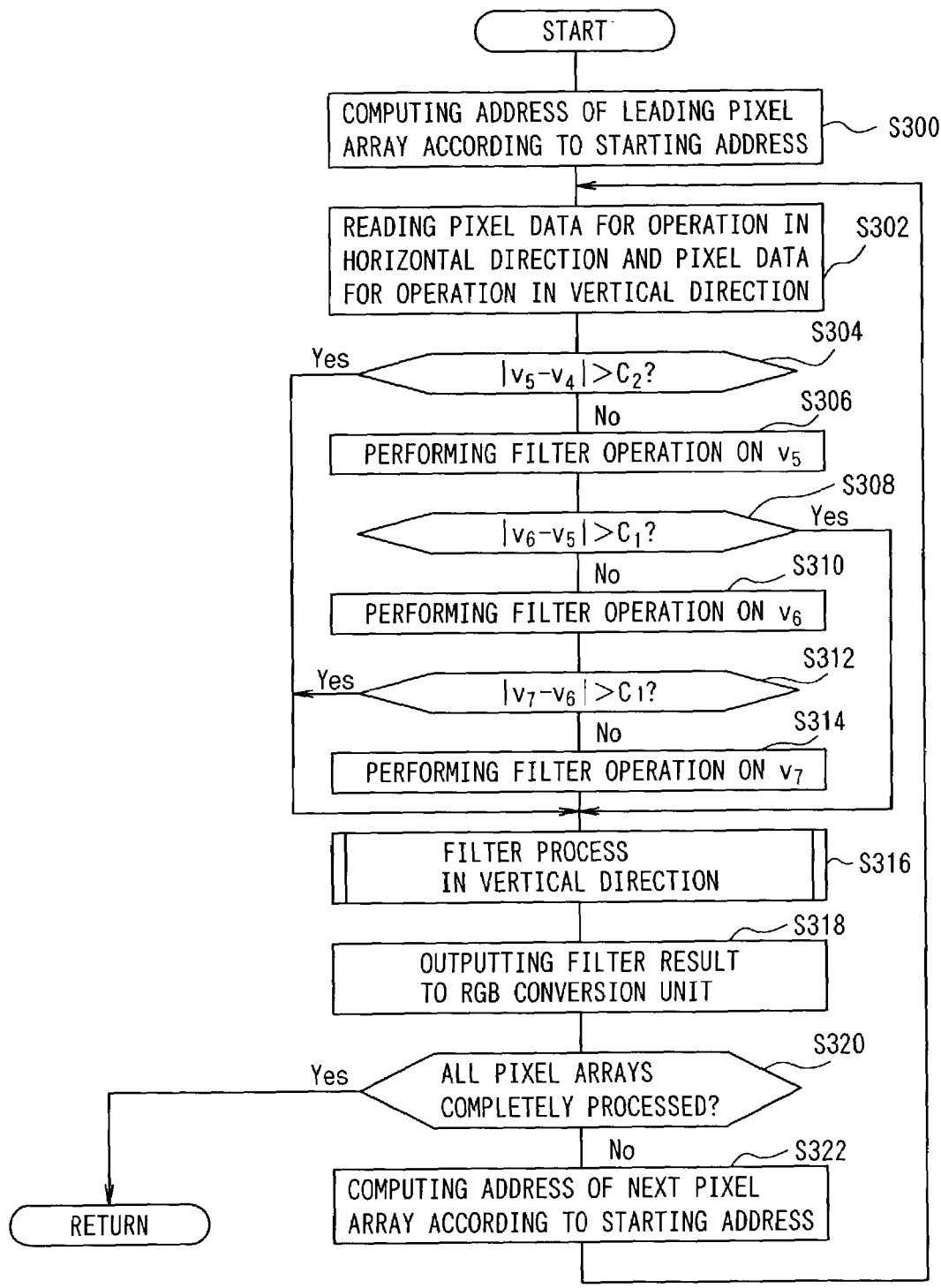
FIG. 6 is a flowchart of the filter process in step S104.

Then, the filter process in step S104 is described below in detail by referring to FIG. 6. FIG. 6 is a flowchart of the filter process in step S104.

The filter process in step S104 is the deblock filter processing performed on the pixel array belonging to the area of the upper left portion of the block. When the process is performed in step S104, control is first passed to step S300 as shown in FIG. 6.

In step S300, according to the starting address obtained in steps S100 and S112, the address of the leading pixel array in the area of the upper left portion of the block is computed, control is passed to step S302, the pixel data required in the operation in the horizontal direction and the pixel data required in the operation in the vertical direction in the pixel array on which the deblock filter processing is to be performed are read to the buffer according to the computed address of the pixel array, and control is passed to step S304.

In step S304, it is determined whether or not the absolute value of the difference between $v_5$ and $v_4$ is larger than the constant value $C_2$. If it is determined that the absolute value of the difference between $v_5$ and $v_4$ is equal to or smaller than the constant value $C_2$ (NO), then control is passed to step S306. The filter arithmetic operation is performed by the equation (5) above using $v_5$ and, $v_4$ to compute $v_5'$, control is passed to step S308, and it is determined whether or not the absolute value of the difference between $v_6$ and $v_5$ is larger than the constant value $C_1$. If it is determined that the absolute value of the difference between $v_6$ and $v_5$ is equal to or smaller than the constant value $C_1$ (NO), then control is passed to step S310.

In step S310, the filter arithmetic operation is performed by the equation (6) above using $v_6$ and $v_4$ to compute $v_6'$, control is passed to step S312, and it is determined whether or not the absolute value of the difference between $v_7$ and $v_6$ is larger than the constant value $C_1$. If it is determined that the absolute value of the difference between $v_7$ and $v_6$ is equal to or smaller than the constant value $C_1$ (NO), then control is passed to step S314, the filter arithmetic operation is performed by the equation (7) above using $v_7$ and $v_4$ to compute $v_7'$, control is passed to step S316.

In step S316, the deblock filter processing is performed on the pixel array in the vertical direction. In this deblock filter processing, the operation is performed in the same manner as in steps S306 to S314.

Then, control is passed to step S318, the data of the pixels belonging to the area of the upper left portion of the block in the pixel data in the buffer is output to the RGB conversion unit 42, control is passed to step S320, and it is determined whether or not the processes in steps S304 to S318 have been completed on all pixel arrays belonging to the area of the upper left portion of the block. If the process has been completed on all pixel arrays (YES), then the series of processes terminates to resume the originating process. If it is determined that the process has not been completed on all pixel arrays (NO), then control is passed to step S322, the address of the next pixel array belonging to the upper left portion of the area in the block is computed based on the start address obtained at steps S100 and S112, and control is passed to step S302.

On the other hand, if it is determined in step S304 that the absolute value of the difference between $v_5$ and $v_4$ is larger than the constant value $C_2$ (YES), if it is determined in step S308 that the absolute value of the difference between $v_6$ and $v_5$ is larger than the constant value $C_1$ (YES), and if it is determined in step S312 that the absolute value of the difference between $v_7$ and $v_6$ is larger than the constant value $C_1$ (YES), then control is passed to step S316.

The process in the horizontal direction in the filter process in step S108 is similar to the processes in steps S304 to S314, and the process in the vertical direction in the filter process in step S106, S108 is similar to the processes in steps S204 to S214.

Figure 7:
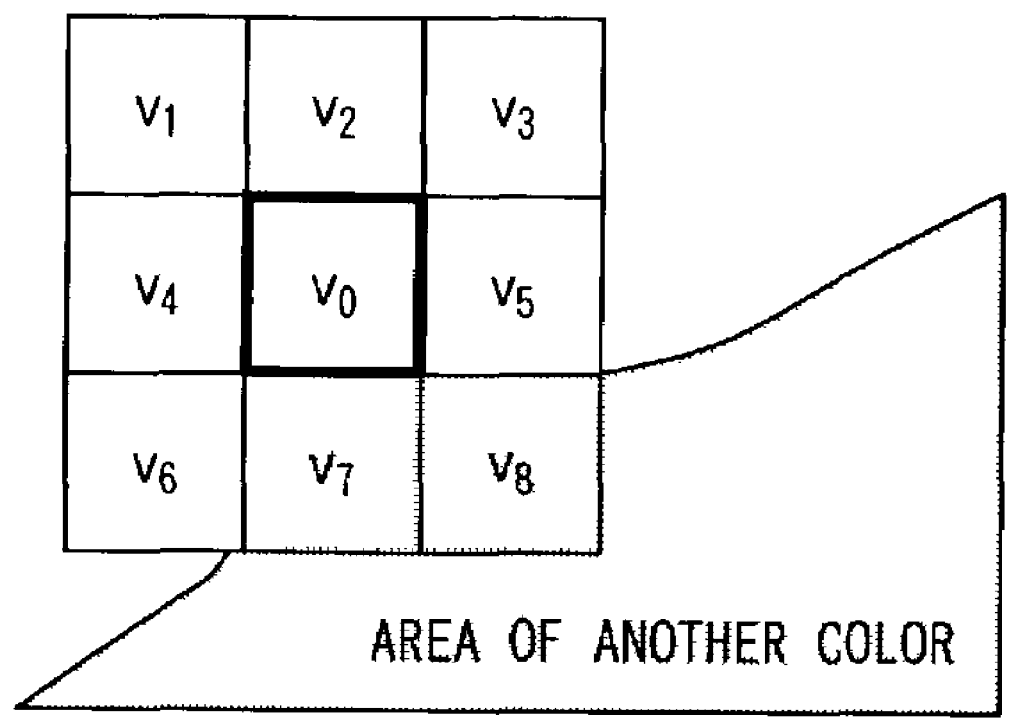
FIG. 7 shows the principle of the deringing filter processing.

The principle of the deringing filter processing according to the present invention is described below in detail by referring to FIG. 7. FIG. 7 shows the principle of the deringing filter processing.

In FIG. 7, the value of the target pixel on which the deringing filter processing is to be performed is set to $v_0$, and the values of the pixels adjacent to the target pixel are set to $v_1$ to $v_8$ respectively for the upper left pixel, the pixel above, the upper right pixel, the left pixel, the right pixel, the lower left pixel, the pixel below, and the lower right pixel.

In this case, the value $v_0'$ after the deringing filter processing on the target pixel is computed by the following equation (30) of the filter arithmetic operation.

$$V=(v_1+v_2+v_3+v_4+v_5+v_6+v_7+v_8)/8 \tag{29}$$

$$v_0'=(v_0+V)/2 \tag{30}$$

However, when an edge is detected, $v_i$ (i=1 to 8) is replaced with $v_0$. $v_1$ is replaced with $v_0$ on the same ground as that the deblock filter processing is not performed when an edge is detected. In the example shown in FIG. 7, $v_7$ and $v_8$ are replaced with $v_0$.

Figure 8:
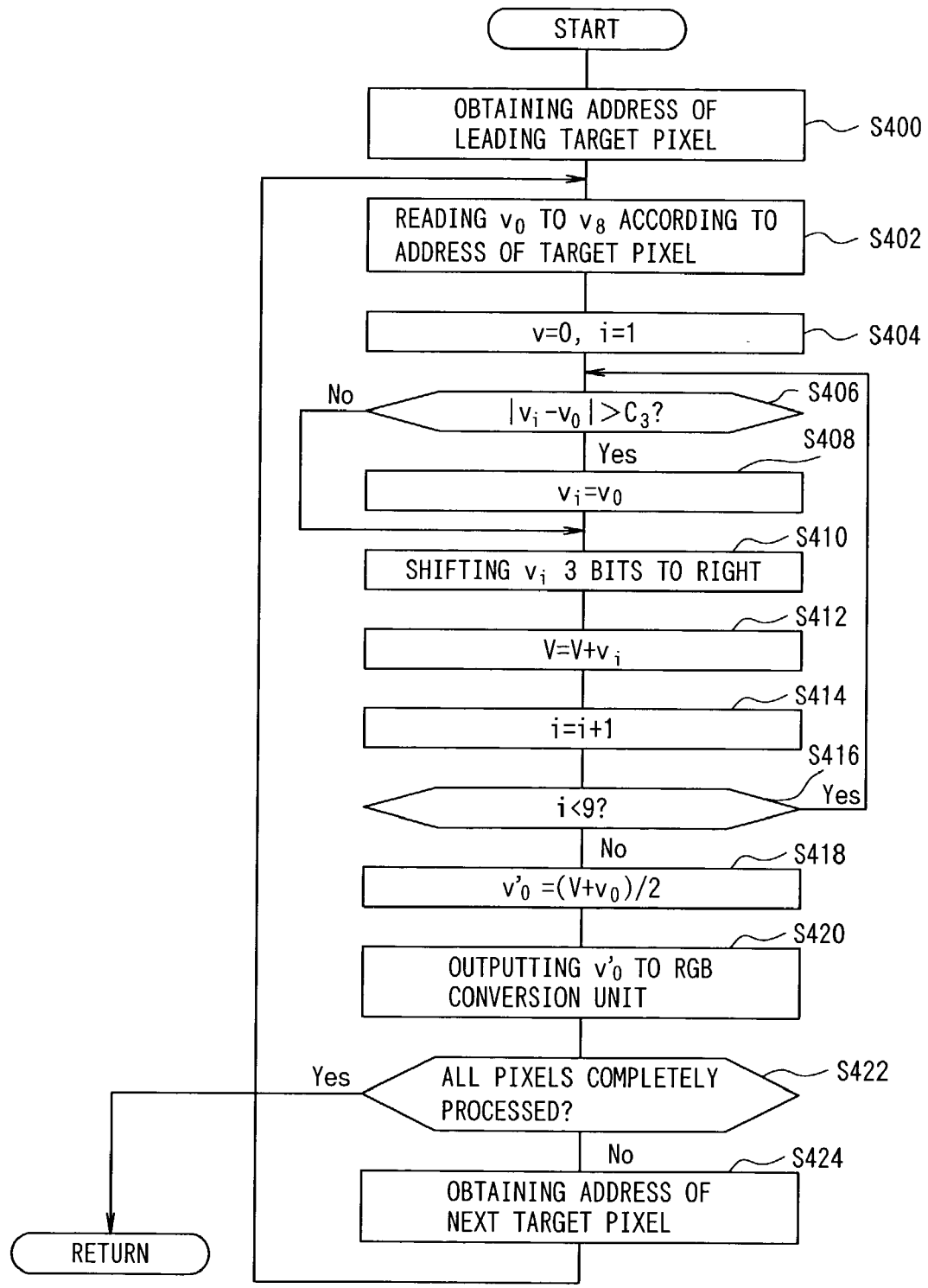
FIG. 8 is a flowchart of the deringing filter processing.

The deringing filter processing according to the present invention can be realized by the process according to the flowchart shown in FIG. 8. FIG. 8 is a flowchart of the deringing filter processing.

When the deringing filter processing is performed by the post filter unit 40, control is passed to step S400 as shown in FIG. 8.

In step S400, the address of the leading target pixel is obtained from the LCDC 36, control is passed to step S402, the target pixels and the values $v_0$ to $v_8$ of the adjacent pixels are read to the buffer according to the addresses of the target pixels, control is passed to step S404, the variable V is set to "0", the variable i is set to "1", and control is passed to step S406.

In step S406, it is determined whether or not the absolute value of the difference between $v_i$ (the subscript i of the v is specified by the value of the variable i) and $v_0$ is larger than the constant value $C_3$. If it is determined that the absolute value of the difference between $v_1$ and $v_0$ is larger than the constant value $C_3$ (YES), then control is passed to step S408. The constant value $C_3$ is set to "16" on the assumption that the maximum value of the pixel is "255". If the constant value $C_3$ is set larger than "16", then the value $v_i$ of the adjacent pixel cannot be replaced with the value $v_0$ of the target pixel although it is to be replaced. As a result, an effective screen effect cannot be obtained. On the other hand, if the constant value $C_3$ is set smaller than "16", the value $v_1$ of the adjacent pixel is replaced with the value $v_0$ of the target pixel although it is not necessary to do so. As a result, an effective screen effect cannot be obtained.

In step S408, the value $v_i$ of the adjacent pixel is replaced with the value $v_0$ of the target pixel, control is passed to step S410, the value $v_i$ of the adjacent pixel is three bits shifted to right to perform a division by "8", control is passed to step S412, the value obtained by adding the value $v_1$ of the adjacent pixel to the value of the variable V is set as a new value of the variable V, control is passed to step S414, the value obtained by adding "1" to the value of the variable i is set as a new value, and control is passed to step S416.

In step S416, it is determined whether or not the value of the variable i is smaller than 9. If it is determined that the value of the variable i is equal to or larger than 9 (NO), then control is passed to step S418, the value $v_0$ of the target pixel is added to the value of the variable V, the value obtained by 1 bit shifting the sum to right is computed as the value $v_0'$, after the deringing filter processing performed on the target pixel, control is passed to step S420, the computed value $v_0'$ is output to the RGB conversion unit 42, and control is passed to step S422.

In step S422, it is determined whether or not the processes from step S402 to step S420 have been completed on all pixels forming one screen of image. If it is determined that all pixels have been completely processed (YES), then a series of processes terminates. If it is not determined so (NO), then control is passed to step S424, and the address of the next target pixel is obtained from the LCDC 36, thereby passing control to step S402.

If it is determined in step S416 that the value of the variable i is smaller than 9 (YES), then control is passed to step S406.

On the other hand, if it is determined in step S406 that the absolute value of the difference between $v_1$ and $v_0$ is equal to or smaller than the constant value $C_3$ (NO), then control is passed to step S410.

Described below is the operation according to First Embodiment of the present invention.

First, the case in which the deblock filter processing is performed is described below by referring to an example of performing the deblock filter processing on each pixel of the pixel array PG1 shown in FIG. 1.

When the deblock filter processing is performed on each pixel of the pixel array PG1, the processes in steps S100, S102, S200, and S202 are first performed, and then the address of the pixel array PG1 in the area of the upper right portion of the block is computed, the pixel data required in the operation in the horizontal direction and the pixel data required in the operation in the vertical direction in the pixel array PG1 are collectively read to the buffer according to the computed address of the pixel array PG1. Since the pixel array PG1 is in the third row from the top, the pixel data including a total of 17 pixels, that is, the four right-to-left contiguous pixels from the upper right pixel in the block, the eight pixels two rows below the four-pixel array, the four right-to-left contiguous pixels from the lower right pixel in the above adjacent block, and the pixel two rows below the upper left pixel in the right adjacent block, is read.

First, after step S204, it is determined whether or not the deblock filter processing is to be performed on the pixel value $v_4$. That is, if the absolute value of the difference between $v_4$ and $v_5$ is equal to or smaller than $C_2$, then, after step S206, the filter arithmetic operation is performed by the equation (4) above based on $v_4$ and $v_5$, and $v_4$ is computed. If it is determined that the deblock filter processing is not performed on $v_4$, then the deblock filter processing is not performed on the pixel values $v_2$ and $v_3$.

If the deblock filter processing is performed on the pixel value $v_4$, then, after step S208, it is determined whether or not the deblock filter processing is to be performed on the pixel value $v_3$. That is, if the absolute value of the difference between $v_3$ and $v_4$ is equal to or smaller than $C_1$, then, after step S210, the filter arithmetic operation is performed by the equation (3) above based on $v_3$ and $v_5$, and $v_3'$ is computed. If it is determined that the deblock filter processing is not performed on $v_3$, then the deblock filter processing is not performed on the pixel values $v_2$.

If the deblock filter processing is performed on the pixel value $v_3$, then, after step S212, it is determined whether or not the deblock filter processing is to be performed on the pixel value $v_2$. That is, if the absolute value of the difference between $v_2$ and $v_3$ is equal to or smaller than $C_1$, then, after step S214, the filter arithmetic operation is performed by the equation (2) above based on $v_2$ and $v_5$, and $v_2'$ is computed.

After steps S216 and S218, the deblock filter processing is performed in the vertical direction on the left half pixels in the pixel array PG1, and the process is completed in the horizontal direction and the vertical direction. Then, in the pixel data in the buffer, the pixel data in the buffer belonging to the area of the upper right portion of the block is output to the RGB conversion unit 42.

Thus, the deblock filter processing is completed on the pixels of the left half of the pixel array PG1.

The processes in steps S100, S104, S300, and S302 are first performed, and then the address of the pixel array PG1 in the area of the upper left portion of the block is computed, the pixel data required in the operation in the horizontal direction and the pixel data required in the operation in the vertical direction in the pixel array PG1 are collectively read to the buffer according to the computed address of the pixel array PG1. Since the pixel array PG1 is in the third row from the top, the pixel data including a total of 17 pixels, that is, the four left-to-right contiguous pixels from the upper left pixel in the block, the eight pixels two rows below the four-pixel array, the four left-to-right contiguous pixels from the lower left pixel in the above adjacent block, and the pixel two rows below the upper right pixel in the left adjacent block, is read.

First, after step S304, it is determined whether or not the deblock filter processing is to be performed on the pixel value $v_5$. That is, if the absolute value of the difference between $v_5$ and $v_4$ is equal to or smaller than $C_2$, then, after step S306, the filter arithmetic operation is performed by the equation (5) above based on $v_5$ and $v_4$, and $v_5'$ is computed. If it is determined that the deblock filter processing is not performed on $v_5$, then the deblock filter processing is not performed on the pixel values $v_6$ and $v_7$.

If the deblock filter processing is performed on the pixel value $v_5$, then, after step S308, it is determined whether or not the deblock filter processing is to be performed on the pixel value $v_6$. That is, if the absolute value of the difference between $v_6$ and $v_5$ is equal to or smaller than $C_1$, then, after step S310, the filter arithmetic operation is performed by the equation (6) above based on $v_6$ and $v_4$, and $v_6'$ is computed. If it is determined that the deblock filter processing is not performed on $v_6$, then the deblock filter processing is not performed on the pixel values $v_7$.

If the deblock filter processing is performed on the pixel value $v_6$, then, after step S312, it is determined whether or not the deblock filter processing is to be performed on the pixel value $v_7$. That is, if the absolute value of the difference between $v_7$ and $v_6$ is equal to or smaller than $C_1$, then, after step S314, the filter arithmetic operation is performed by the equation (7) above based on $v_7$ and $v_4$, and $v_7'$ is computed.

After steps S316 and S318, the deblock filter processing is performed in the vertical direction on the right half pixels in the pixel array PG1, and the process is completed in the horizontal direction and the vertical direction. Then, in the pixel data in the buffer, the pixel data in the buffer belonging to the area of the upper left portion of the block is output to the RGB conversion unit 42.

Thus, the deblock filter processing is completed on the pixels of the right half of the pixel array PG1.

Described below is the case in which the deringing filter processing is performed.

When the deringing filter processing is performed, the processes are performed in steps S400 to S404 first, and then a target pixel and the values $v_0$ to $v_8$ of the adjacent pixel are read to the buffer according to the address of the target pixel.

Then, after repeating the processes in steps S406 to S416, the value $v_1$ of each adjacent pixel is replaced with the value $v_0$ of a target pixel if the absolute value of the difference between $v_1$ and $v_0$ is larger than the constant value $C_3$. Otherwise, the value $v_i$ of the adjacent pixel is used as is, the value $v_i$ of the adjacent pixel is 3 bit shifted to right, and the value obtained by adding the value $v_i$ of the adjacent pixel to the value of the variable V is set as a new value of the variable V. That is, the value $v_i$ of each adjacent pixel is divided by 8, and the quotients are added up. Thus, the above mentioned arithmetic process obtains an average value V of the adjacent pixels.

Then, after steps S418 and S420, the value $v_0$ of a target pixel is added to the value of the variable V, and the sum is one bit shifted to right, and the result is obtained as the value $v_0'$ after the filter process of the target pixel, and the obtained value $v_0'$ is output to the RGB conversion unit 42.

Thus, according to the present embodiment, the deblock filter processing computes the values $v_2'$ to $v_7'$ of the pixels after the deblock filter processing performed on the pixel array normal to the boundary between the adjacent blocks by using filter arithmetic operation equations (2) to (7).

Thus, when a filter arithmetic operation is performed on a pixel, an average value of a number of pixels is not used, but only the values of two pixels are used. Therefore, as compared with the conventional technology, the deblock filter processing can be simplified. For example, as in the present embodiment, when the deblock filter processing is realized by hardware, a smaller circuit can be obtained, and when it is realized by software, a program size can be reduced. Furthermore, since an operation is performed by an addition or a subtraction using the value of a pixel and the value of a pixel in the same pixel array and a boundary pixel in the adjacent block, and by a bit shift (division in which a divisor is an integral multiple of 2), the deblock filter processing can be further simplified, and an effective screen effect can be realized to a certain extent.

Additionally, in the deblock filter processing according to the present embodiment, a filter arithmetic operation is performed on a pixel in the pixel array normal to the boundary of the adjacent blocks when the difference value between the pixel and each pixel in the same pixel array and in the boundary in the adjacent block does not exceed the threshold values $C_1$ and $C_2$ for which constant values are used.

Since the threshold values $C_1$ and $C_2$ are constant values, it is not necessary to compute the threshold values $C_1$ and $C_2$ during the deblock filter processing. If any of the difference values of the pixels exceeds the threshold values $C_1$ and $C_2$, no filter arithmetic operations are performed. Therefore, in addition to further simplification of the deblock filter processing, the deblock filter processing can be perform in a relatively higher speed than the conventional technology.

In addition, according to the present embodiment, the threshold value $C_2$ for use in comparison of difference values between a boundary pixel and a pixel adjacent to the boundary pixel is set larger than the threshold value $C_1$ for use in comparison of difference values between the boundary pixel and a pixel other than the adjacent pixels.

Thus, the deblock filter processing can be performed with the characteristic that the average values of brightness between blocks are different taken into account, thereby realizing a more effective screen effect.

Furthermore, according to the present embodiment, the threshold value $C_2$ for use in comparison of difference values between a boundary pixel and a pixel adjacent to the boundary pixel is set to 32 on the assumption that the maximum value of a pixel is 255, and the threshold value $C_1$ for comparison of difference values between a boundary pixel and a pixel other than the adjacent pixels is set to 16.

Thus, the deblock filter processing can be performed with the characteristic that the average values of the brightness between blocks are different taken into account, thereby realizing a more effective screen effect.

Furthermore, in the deblock filter processing according to the present invention, it is determined whether or not a filter arithmetic operation is to be performed on a pixel. If it is determined that the process is performed in the farther direction from a boundary pixel and a pixel adjacent to the boundary pixel, and that no filter arithmetic operation is performed on pixels, then no filter arithmetic operation is performed on the pixel and the subsequent pixels.

Thus, since the frequency of determining whether or not a filter arithmetic operation is performed on a pixel can be reduced, the deblock filter processing can be performed in a higher speed.

According to the present embodiment, the post filter unit 40 comprises a buffer capable of storing 17-pixel pixel data, and the deblock filter processing is performed by collectively reading to the buffer all pixel data in a pixel array from a pixel to a boundary pixel from VRAM 35, and performing a filter arithmetic operation.

Thus, since necessary pixel data in performing the deblock filter processing on each pixel in the pixel array can be collectively read to the buffer and processed, the deblock filter processing can be performed in a higher speed.

Furthermore, in the deblock filter processing according to the present embodiment, a filter arithmetic operation is performed on a pixel array in one of the horizontal direction and the vertical direction in the block, and then performed on the pixel array in the other direction.

Since the deblock filter processing is performed on the pixel arrays in both horizontal and vertical directions in the block, a more effective screen effect can be realized.

Additionally, in the deringing filter processing according to the present embodiment, a filter arithmetic operation performed on a pixel is performed on the value of a target pixel on which the operation is to be performed, and on the value of the pixel adjacent to the target pixel. If the difference value between one of the adjacent pixels and a target pixel exceeds the threshold value $C_3$ in the filter arithmetic operation, then the value of the pixel can be replaced with the value of the target pixel.

Thus, regardless of whether or not the difference value between each adjacent pixel and a target pixel exceeds the threshold value $C_3$, the divisor used in computing an average value of adjacent pixels is constant (8), and the divisor is an integral multiple of 2, the operation can be performed by a bit shift. Therefore, as compared with the conventional technology, the deringing filter processing can be simplified. For example, as in the present embodiment, when the deringing filter processing is realized by hardware, a smaller circuit can be realized, and when the deringing filter processing is realized by software, a program size can be reduced.

Furthermore, according to the present embodiment, a constant value is used as the threshold value $C_3$ in the deringing filter processing.

Thus, since the threshold value $C_3$ is a constant value, it is not necessary to compute the threshold value $C_3$ during the deringing filter processing. Therefore, the deringing filter processing can be further simplified.

According to the present embodiment, the threshold value $C_3$ is set to 16 on the assumption that the maximum value of the pixel is 255 in the deringing filter processing.

Thus, an effective screen effect can be realized in a certain extent.

Furthermore, in the deringing filter processing according to the present embodiment, the filter arithmetic operation performed on a pixel is performed by dividing the value of a target pixel on which the operation is to be performed by 8, dividing the value of the pixel adjacent to the target pixel by 8, and adding up the quotients.

Since addition is performed after division, less memory is required to perform an operation in the deringing filter processing as compared with the conventional technology.

According to the First Embodiment, the moving image data in the MPEG format corresponds to the compressed image data according to claims 1, 18, 19, 22, 24 to 27, 30, 32 to 35, 38, or 40, the VRAM 35 corresponds to the image memory means according to claims 9, 19, 27, or 35, and the buffer of the post filter unit 40 corresponds to the memory means for work according to claims 9, 19, 27, or 35.

The Second Embodiment according to the present invention is described below by referring to the attached drawings. FIGS. 9 to 13 show the image processor, the image processing program, and the image processing method according to the present invention. Only the difference from the First Embodiment is described below, an the duplicate description is omitted with the same reference numeral assigned.

In the present embodiment, the image processor, the image processing program, and the image processing method according to the present invention are applied when the deblock filter processing is performed on a regenerated image in the process of regenerating a moving image by decoding the moving image data compressed in the MPEG format by the OS operating by a multitask in a computer 100 as shown in FIG. 1. The difference from the First Embodiment is that the deblock filter processing is performed only by the filter arithmetic operation equations (1) to (4).

Figure 9:
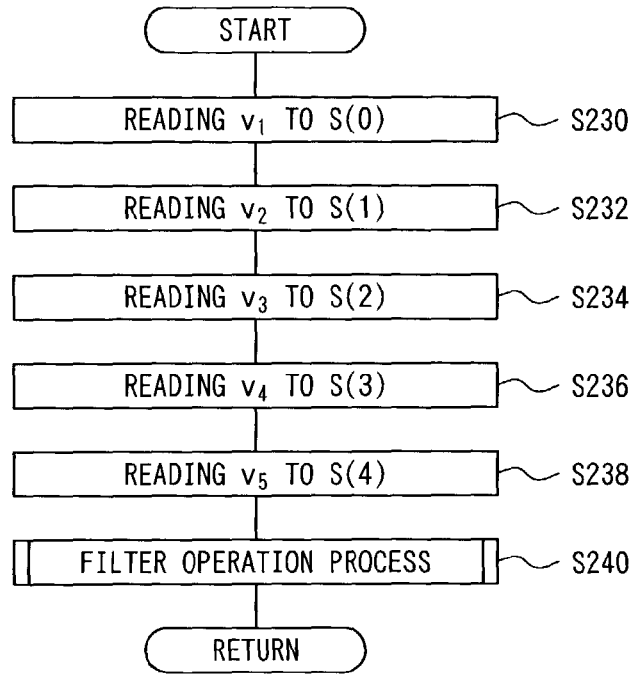
FIG. 9 is a flowchart of the pixel value reading process about the area of the upper right portion of a block.
Figure 10:
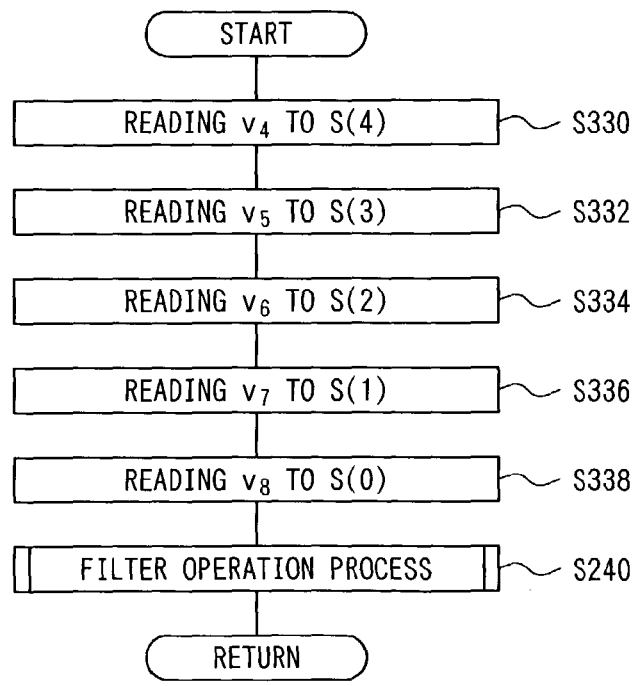
FIG. 10 is a flowchart of the pixel value reading process about the area of the upper left portion of a block.

The post filter unit 40 performs the pixel value reading process shown in the flowchart in FIG. 9 instead of the processes in steps S202 to 214, and performs the pixel value reading process shown in the flowchart in FIG. 10 instead of the processes in steps S302 to S314.

First, the pixel value reading process performed on the area of the upper right portion of a block is described in detail by referring to FIG. 9. FIG. 9 is a flowchart showing the pixel value reading process on the area of the upper right portion of a block.

When the pixel value reading process on the area of the upper right portion of a block is performed by the post filter unit 40, control is passed to step S230 as shown in FIG. 9. In the explanation below, s(0) to s(4) are array type variables. They can be assigned in the buffer, and can be reserved in other areas than the buffer.

In step S230, the pixel value $v_1$ is read to s(0), control is passed to step S232, the pixel value $v_2$ is read to s(1), control is passed to step S234, the pixel value $v_3$ is read to s(2), control is passed to step S236, the pixel value $v_4$ is read to s(3), control is passed to step S238, the pixel value $v_5$ is read to s(4), and control is passed to step S240.

In step S240, the filter arithmetic operation process is performed by a filter arithmetic operation by the equations (1) to (4) based on the values of s(0) to s(4), a series of processes is completed, and control is returned to the originating process.

The pixel value reading process on the area of the upper left portion of a block is described below in detail by referring to FIG. 10. FIG. 10 is a flowchart of the pixel value reading process on the area of the upper left portion of a block.

When the pixel value reading process on the area of the upper left portion of a block is performed by the post filter unit 40, control is passed to step S330 as shown in FIG. 10.

In step S330, the pixel value $v_4$ is read to s(4), control is passed to step S332, the pixel value $v_5$ is read to s(3), control is passed to step S334, the pixel value $v_6$ is read to s(2), control is passed to step S336, the pixel value $v_7$ is read to s(1), control is passed to step S338, the pixel value $v_8$ is read to s(0), and control is passed to step S240.

Figure 11:
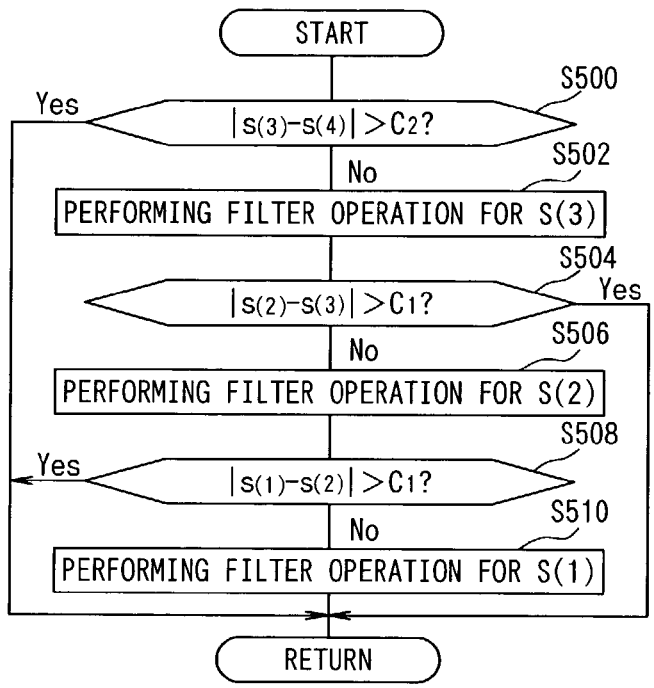
FIG. 11 is a flowchart of the filter arithmetic operation process in step S240.

The filter arithmetic operation process in step S240 is described below by referring to FIG. 11. FIG. 11 is a flowchart of the filter arithmetic operation process in step S240.

When the filter arithmetic operation process is performed in step S240, control is passed to step S500 as shown in FIG. 11.

In step S500, it is determined whether or not the absolute value of the difference between s(3) and s(4) is larger than the constant value $C_2$. If it is determined that the absolute value of the difference between s(3) and s(4) is equal to or smaller than the constant value $C_2$ (NO), then control is passed to step S502, s'(3) is computed by performing the filter arithmetic operation by the equation (4) above based on values of s(3) and s(4), and control is passed to step S504.

In step S504, it is determined whether or not the absolute value of the difference between s(2) and s(3) is larger than the constant value $C_1$. If it is determined that the absolute value of the difference between s(2) and s(3) is equal to or smaller than the constant value $C_1$(NO), then control is passed to step S506, s'(2) is computed by performing the filter arithmetic operation by the equation (3) above based on values of s(2) and s(4), and control is passed to step S508.

In step S508, it is determined whether or not the absolute value of the difference between s(1) and s(2) is larger than the constant value $C_1$. If it is determined that the absolute value of the difference between s(1) and s(2) is equal to or smaller than the constant value $C_1$ (NO), then control is passed to step S510, s'(1) is computed by performing the filter arithmetic operation by the equation (2) above based on values of s(1) and s(4), and a series of processes is completed, thereby resuming the originating process.

On the other hand, if it is determined in step S500 that the absolute value of the difference between s(3) and s(4) is larger than the constant value $C_2$ (YES), if it is determined in step S504 that the absolute value of the difference between s(2) and s(3) is larger than the constant value $C_1$ (YES), and if it is determined in step S508 that the absolute value of the difference between s(1) and s(2) is larger than the constant value $C_1$ (YES), then a series of processes terminates, and the process is returned to the originating process.

Figure 12:
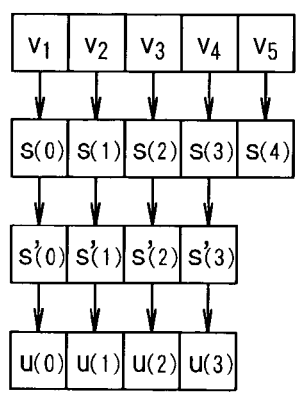
FIG. 12(*a*)–(*b*) show the case in which the pixel values $v_1$ to $v_8$ are rearranged.
Figure 12:
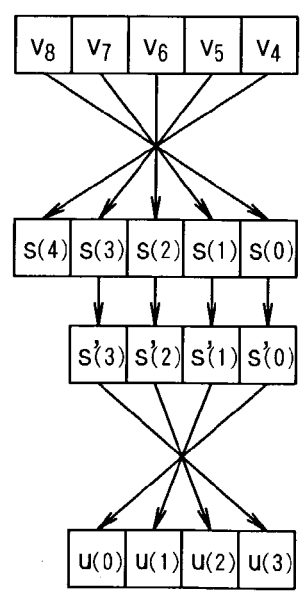
Figure 13:
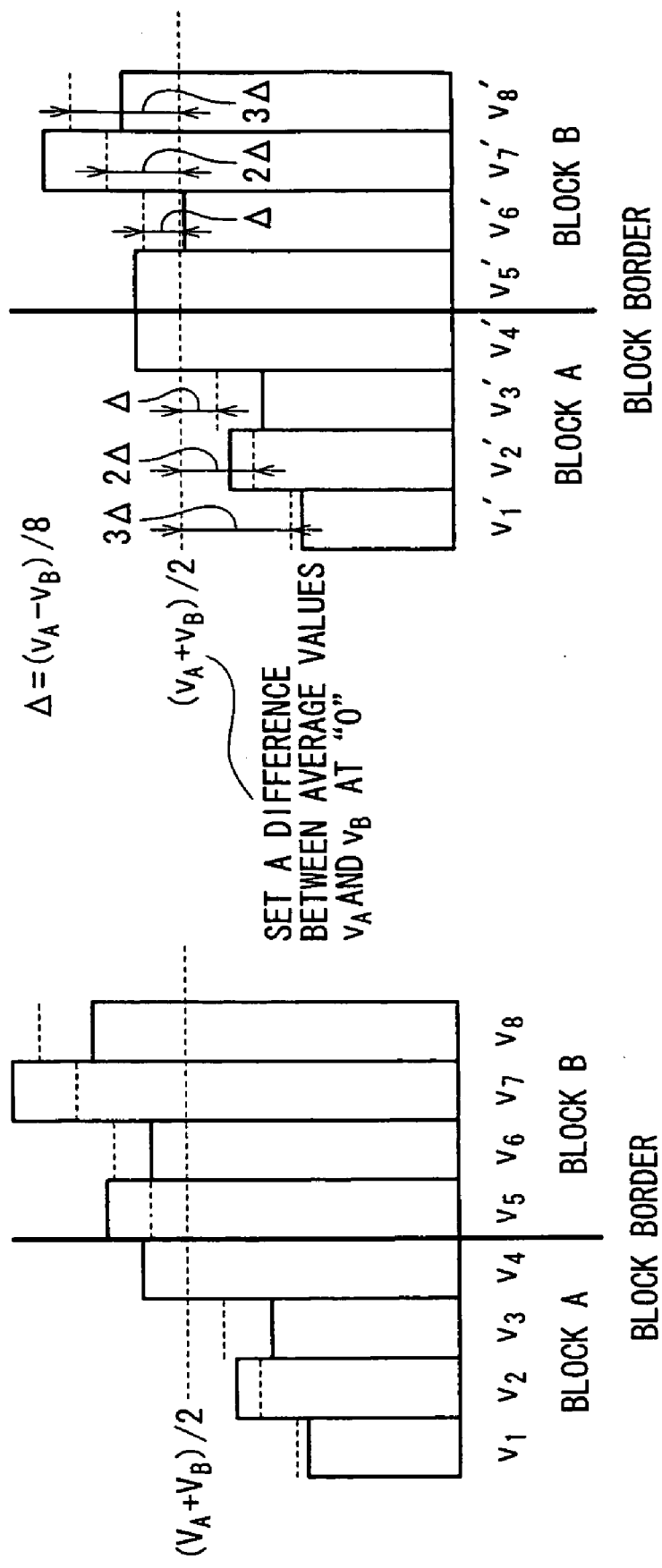
FIG. 13(*a*)–(*b*) are bar graphs showing the value of each pixel of the pixel array PG1.

The operations according to the Second Embodiment are described below by referring to FIGS. 12 and 13. FIG. 12 shows the case in which the pixel values $v_1$ to $v_8$ are rearranged for operations. FIG. 13 is a bar graph showing the value of each pixel of the pixel array PG1.

First, the deblock filter processing is described below by referring to an example of performing the deblock filter processing on each pixel of the pixel array PG1 shown in FIG. 1.

When the deblock filter processing is performed on each pixel of the pixel array PG1, the processes in steps S200, S202, S230 to S238 are performed, the necessary pixel data for the operations in the horizontal direction and the necessary pixel data for the operations in the vertical direction relating to the pixel array PG1 are collectively read to the buffer according to the address of the pixel array PG1, and the pixel values $v_1$ to $v_5$ are read to s(0) to s(4) respectively as shown in FIG. 12(A).

After step S500, it is determined whether or not the deblock filter processing is performed for s(3). That is, if the absolute value of the difference between s(3) and s(4) is equal to or smaller than the constant value $C_2$, then the process in step S502 is performed, the filter arithmetic operation is performed by the equation (4) above based on the values s(3) and s(4), and s'(3) is computed. If it is determined that the deblock filter processing is not performed for s(3), then the deblock filter processing is not performed for s(1) and s(2), either.

When the deblock filter processing is performed for s(3), after step S504, it is determined whether or not the deblock filter processing is performed for s(2). That is, if the absolute value of the difference between s(2) and s(3) is equal to or smaller than the constant value $C_1$, then the process in step S506 is performed, the filter arithmetic operation is performed by the equation (3) above based on the values s(2) and s(4), and s'(2) is computed. If it is determined that the deblock filter processing is not performed for s(2), then the deblock filter processing is not performed for s(1), either.

When the deblock filter processing is performed for s(2), after step S508, it is determined whether or not the deblock filter processing is performed for s(1). That is, if the absolute value of the difference between s(1) and s(2) is equal to or smaller than the constant value $C_1$, then, after step S510, s'(1) is computed by performing the filter arithmetic operation by the equation (2) based on s(1) and s(4).

Then, after steps S216 and S218, the deblock filter processing is performed in the vertical direction on the pixels of the left half of the pixels of the pixel array PG1.

When the process is completed both in horizontal and vertical directions, the values s'(1) to s'(3) are output to the RGB conversion unit 42.

Thus, the deblock filter processing is completed on the pixels of the left half of the pixel array PG1.

Then, after steps S300, S302, and S330 to S338, the necessary pixel data for the operations in the horizontal direction and the necessary pixel data for the operations in the vertical direction relating to the pixel array PG1 are collectively read to the buffer according to the address of the pixel array PG1, and the pixel values $v_4$ to $v_8$ are read to s(4) to s(0) respectively as shown in FIG. 12(B).

After step S500, it is determined whether or not the deblock filter processing is performed for s(3). That is, if the absolute value of the difference between s(3) and s(4) is equal to or smaller than the constant value $C_2$, then the process in step S502 is performed, the filter arithmetic operation is performed by the equation (4) above based on the values s(3) and s(4), and s'(3) is computed. If it is determined that the deblock filter processing is not performed for s(3), then the deblock filter processing is not performed for s(1) and s(2), either.

When the deblock filter processing is performed for s(3), after step S504, it is determined whether or not the deblock filter processing is performed for s(2). That is, if the absolute value of the difference between s(2) and s(3) is equal to or smaller than the constant value $C_1$, then the process in step S506 is performed, the filter arithmetic operation is performed by the equation (3) above based on the values s(2) and s(4), and s'(2) is computed. If it is determined that the deblock filter processing is not performed for s(2), then the deblock filter processing is not performed for s(1), either.

When the deblock filter processing is performed for s(2), after step S508, it is determined whether or not the deblock filter processing is performed for s(1). That is, if the absolute value of the difference between s(1) and s(2) is equal to or smaller than the constant value $C_1$, then, after step S510, s'(1) is computed by performing the filter arithmetic operation by the above equation (2) based on s(1) and s(4).

Then, after steps S316 and S318, the deblock filter processing is performed in the vertical direction on the pixels of the right half of the pixels of the pixel array PG1. When the process is completed both in horizontal and vertical directions, the values s'(1) to s'(3) are output to the RGB conversion unit 42. At this time, as shown in FIG. 12(B), the contents of s'(0) to s'(4) are rearranged in the inverse order, and the values of s'(1) to s'(3) are output to the RGB conversion unit 42.

Thus, the deblock filter processing is completed on the pixels of the left half of the pixel array PG1.

In the deblock filter processing according to the present embodiment, each of the pixel values $v_1$ to $v_8$ is corrected as shown in FIG. 13(A) while the values are collected as shown in FIG. 13(B).

Thus, in the deblock filter processing according to the present embodiment, the pixel values $v_2$ to $v_5$ in the pixel array normal to the boundary between the adjacent blocks are read to s(1) to s(4), the pixel values $v_2'$ to $v_4'$ after the filtering process are computed by the filter arithmetic operation equations (2) to (4) above, the pixel values $v_4$ to $v_7$ are read to s(4) to s(1), the pixel values $v_5'$ to $v_7'$ after the filtering process are computed by the filter arithmetic operation equations (2) to (4) above.

Since three filter arithmetic operation equations are to be prepared to perform the deblock filter processing on six pixels, the deblock filter processing can be further simplified.

According to the above mentioned Second Embodiment, the moving image data in the MPEG format corresponds to the compressed image data according to claim 20, 28, or 36.

The Third Embodiment according to the present invention is described below by referring to the attached drawings. FIGS. 14 to 17 show the image processor, the image processing program, and the image processing method according to the Third Embodiment. Only the difference from the First Embodiment is described below, an the duplicate description is omitted with the same reference numeral assigned.

In the present embodiment, the image processor, the image processing program, and the image processing method according to the present invention are applied when the deblock filter processing is performed on a regenerated image in the process of regenerating a moving image by decoding the moving image data compressed in the MPEG format by the OS operating by a multitask in a computer 100 as shown in FIG. 1. The difference from the First Embodiment is that the deblock filter processing is performed only by the filter arithmetic operation equations (5) to (8).

Figure 14:
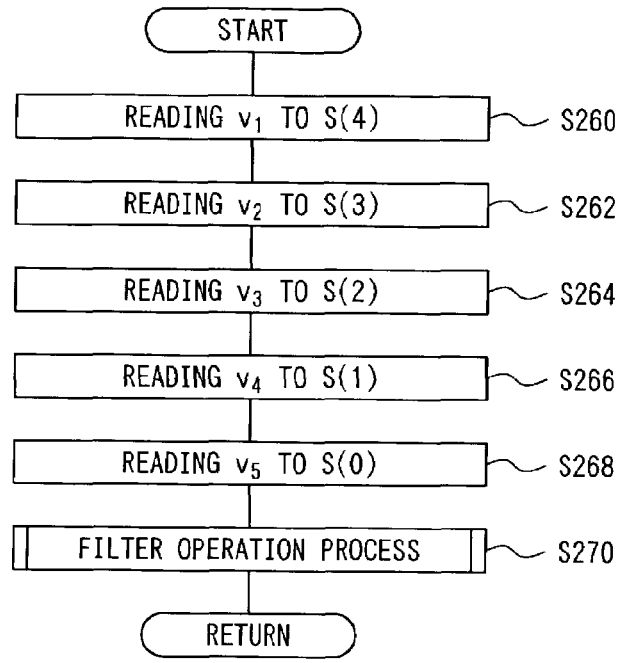
FIG. 14 is a flowchart of the pixel value reading process about the area of the upper right portion of a block.
Figure 15:
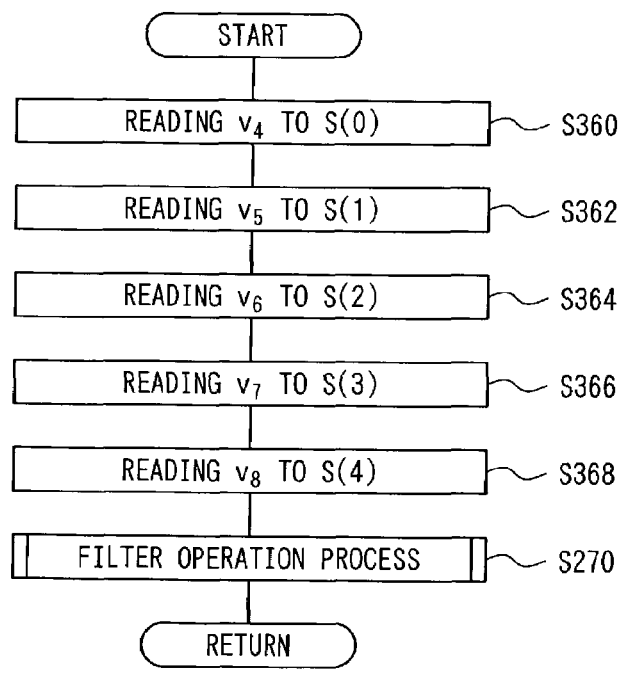
FIG. 15 is a flowchart of the pixel value reading process about the area of the upper left portion of a block.

The post filter unit 40 performs the pixel value reading process shown in the flowchart in FIG. 14 instead of the processes in steps S202 to 214, and performs the pixel value reading process shown in the flowchart in FIG. 15 instead of the processes in steps S302 to S314.

First, the pixel value reading process performed on the area of the upper right portion of a block is described in detail by referring to FIG. 14. FIG. 14 is a flowchart showing the pixel value reading process on the area of the upper right portion of a block.

When the pixel value reading process on the area of the upper right portion of a block is performed by the post filter unit 40, control is passed to step S260 as shown in FIG. 14. In the explanation below, s(0) to s(4) are array type variables. They can be assigned in the buffer, and can be reserved in other areas than the buffer.

In step S260, the pixel value $v_1$ is read to s(4), control is passed to step S262, the pixel value $v_2$ is read to s(3), control is passed to step S264, the pixel value $v_3$ is read to s(2), control is passed to step S266, the pixel value $v_4$ is read to s(1), control is passed to step S268, the pixel value $v_5$ is read to s(0), and control is passed to step S270.

In step S270, the filter arithmetic operation process is performed by a filter arithmetic operation by the equations (5) to (8) based on the values of s(0) to s(4), a series of processes is completed, and control is returned to the originating process.

The pixel value reading process on the area of the upper left portion of a block is described below in detail by referring to FIG. 15. FIG. 15 is a flowchart of the pixel value reading process on the area of the upper left portion of a block.

When the pixel value reading process on the area of the upper left portion of a block is performed by the post filter unit 40, control is passed to step S360 as shown in FIG. 15.

In step S360, the pixel value $v_4$ is read to s(0), control is passed to step S362, the pixel value $v_5$ is read to s(1), control is passed to step S364, the pixel value $v_6$ is read to s(2), control is passed to step S366, the pixel value $v_7$ is read to s(3), control is passed to step S368, the pixel value $v_8$ is read to s(4), and control is passed to step S270.

Figure 16:
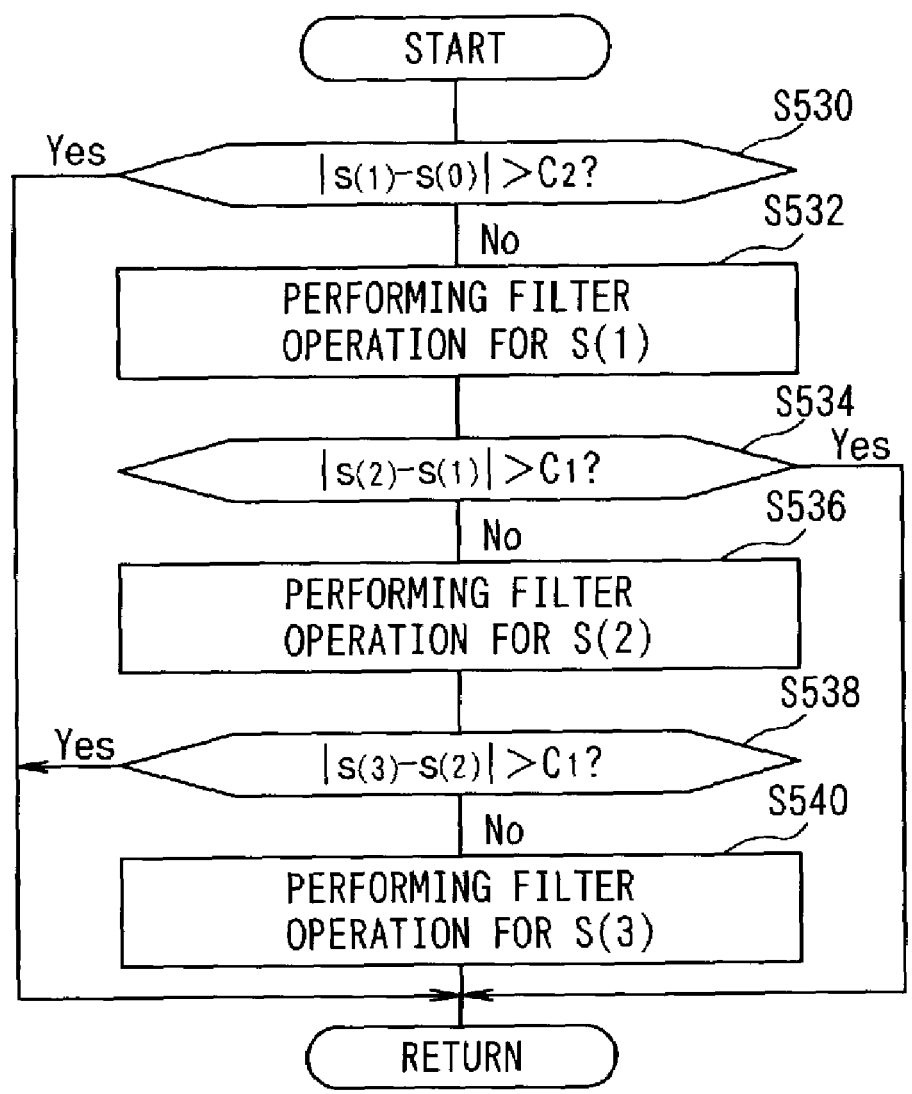
FIG. 16 is a flowchart filter arithmetic operation process in step S270.

The filter arithmetic operation process in step S270 is described below by referring to FIG. 16. FIG. 16 is a flowchart of the filter arithmetic operation process in step S270.

When the filter arithmetic operation process is performed in step S270, control is passed to step S530 as shown in FIG. 16.

In step S530, it is determined whether or not the absolute value of the difference between s(1) and s(0) is larger than the constant value $C_2$. If it is determined that the absolute value of the difference between s(1) and s(0) is equal to or smaller than the constant value $C_2$ (NO), then control is passed to step S532, s'(1) is computed by performing the filter arithmetic operation by the equation (5) above based on values of s(1) and s(0), and control is passed to step S534.

Instep S534, it is determined whether or not the absolute value of the difference between s(2) and s(1) is larger than the constant value $C_1$. If it is determined that the absolute value of the difference between s(2) and s(1) is equal to or smaller than the constant value $C_1$ (NO), then control is passed to step S536, s'(2) is computed by performing the filter arithmetic operation by the equation (6) above based on values of s(2) and s(0), and control is passed to step S538.

Instep S538, it is determined whether or not the absolute value of the difference between s(3) and s(2) is larger than the constant value $C_1$. If it is determined that the absolute value of the difference between s(3) and s(2) is equal to or smaller than the constant value $C_1$ (NO), then control is passed to step S540, s'(3) is computed by performing the filter arithmetic operation by the equation (7) above based on values of s(3) and s(0), and a series of processes is completed, thereby resuming the originating process.

On the other hand, if it is determined in step S530 that the absolute value of the difference between s(1) and s(0) is larger than the constant value $C_2$ (YES), if it is determined in step S534 that the absolute value of the difference between s(2) and s(1) is larger than the constant value $C_1$ (YES), and if it is determined in step S538 that the absolute value of the difference between s(3) and s(2) is larger than the constant value $C_1$ (YES), then a series of processes terminates, and the process is returned to the originating process.

The operations according to the Third Embodiment are described below by referring to FIGS. 17. FIG. 17 is a bar graph showing the value of each pixel of the pixel array PG1.

First, the deblock filter processing is described below by referring to an example of performing the deblock filter processing on each pixel of the pixel array PG1 shown in FIG. 1.

When the deblock filter processing is performed on each pixel of the pixel array PG1, the processes in steps S200, S202, S260 to S268 are performed, the necessary pixel data for the operations in the horizontal direction and the necessary pixel data for the operations in the vertical direction relating to the pixel array PG1 are collectively read to the buffer according to the address of the pixel array PG1, and the pixel values $v_1$ to $v_5$ are read to s(4) to s(0) respectively as shown in FIG. 12(B).

After step S530, it is determined whether or not the deblock filter processing is performed for s(1). That is, if the absolute value of the difference between s(1) and s(0) is equal to or smaller than the constant value $C_2$, then the process in step S532 is performed, the filter arithmetic operation is performed by the equation (5) above based on the values of s(1) and s(0), and s'(1) is computed. If it is determined that the deblock filter processing is not performed for s(1), then the deblock filter processing is not performed for s(2) and s(3), either.

When the deblock filter processing is performed for s(2), after step S534, it is determined whether or not the deblock filter processing is performed for s(2). That is, if the absolute value of the difference between s(2) and s(1) is equal to or smaller than the constant value $C_1$, then the process in step S536 is performed, the filter arithmetic operation is performed by the equation (6) above based on the values s(2) and s(0), and s'(2) is computed. If it is determined that the deblock filter processing is not performed for s(2), then the deblock filter processing is not performed for s(3), either.

When the deblock filter processing is performed for s(2), after step S538, it is determined whether or not the deblock filter processing is performed for s(3). That is, if the absolute value of the difference between s(3) and s(2) is equal to or smaller than the constant value $C_1$, then, after step S540, s'(3) is computed by performing the filter arithmetic operation by the above equation (7) based on s(3) and s(0).

Then, after steps S216 and S218, the deblock filter processing is performed in the vertical direction on the pixels of the left half of the pixels of the pixel array PG1. When the process is completed both in horizontal and vertical directions, the values s'(1) to s'(3) are output to the RGB conversion unit 42. At this time, as shown in FIG. 12(B), the contents of s'(0) to s'(4) are rearranged in the inverse order, and then the values of s'(1) to s'(3) are output to the RGB conversion unit 42.

Thus, the deblock filter processing is completed on the pixels of the left half of the pixel array PG1.

Then, after steps S300, S302, and S360 to S368, the necessary pixel data for the operations in the horizontal direction and the necessary pixel data for the operations in the vertical direction relating to the pixel array PG1 are collectively read to the buffer according to the address of the pixel array PG1, and the pixel values $v_4$ to $v_8$ are read to s(0) to s(4) respectively as shown in FIG. 12(A).

After step S530, it is determined whether or not the deblock filter processing is performed for s(1). That is, if the absolute value of the difference between s(1) and s(0) is equal to or smaller than the constant value $C_2$, then the process in step S532 is performed, the filter arithmetic operation is performed by the equation (5) above based on the values s(1) and s(0), and s'(1) is computed. If it is determined that the deblock filter processing is not performed for s(1), then the deblock filter processing is not performed for s(2) and s(3), either.

When the deblock filter processing is performed for s(2), after step S534, it is determined whether or not the deblock filter processing is performed for s(2). That is, if the absolute value of the difference between s(2) and s(1) is equal to or smaller than the constant value $C_1$, then the process in step S536 is performed, the filter arithmetic operation is performed by the equation (6) above based on the values s(2) and s(0), and s'(2) is computed. If it is determined that the deblock filter processing is not performed for s(2), then the deblock filter processing is not performed for s(3), either.

When the deblock filter processing is performed for s(2), after step S538, it is determined whether or not the deblock filter processing is performed for s(3). That is, if the absolute value of the difference between s(3) and s(2) is equal to or smaller than the constant value $C_1$, then, after step S540, s'(3) is computed by performing the filter arithmetic operation by the above equation (7) based on s(3) and s(0).

Then, after steps S316 and S318, the deblock filter processing is performed in the vertical direction on the pixels of the right half of the pixels of the pixel array PG1. When the process is completed both in horizontal and vertical directions, the values s'(1) to s'(3) are output to the RGB conversion unit 42.

Thus, the deblock filter processing is completed on the pixels of the right half of the pixel array PG1.

Each of the pixel values $v_1$ to $v_8$ is corrected as shown in FIG. 17(A) according to the First Embodiment of the present invention while the values are corrected in the deblock filter processing according to the present embodiment as shown in FIG. 17(B). A higher quality image can be obtained in the deblock filter processing without the deringing filter processing according to the present embodiment than in the deblock filter processing according to the above mentioned Second Embodiment. However, when the deblock filter processing is performed in combination with the deringing filter processing, a higher quality image can be obtained in the deblock filter processing according to the Second Embodiment. Therefore, it is desired that they are selected depending on the use of the deringing filter processing.

Thus, in the deblock filter processing according to the present embodiment, the pixel values $v_4$ to $v_7$ in the pixel array normal to the boundary between the adjacent blocks are read to s(0) to s(3), the pixel values $v_5'$ to $v_7'$ after the filtering process are computed by the filter arithmetic operation equations (5) to (7) above, the pixel values $v_2$ to $v_5$ are read to s(3) to s(0), the pixel values $v_2'$ to $v_4'$ after the filtering process are computed by the filter arithmetic operation equations (5) to (7) above.

Since three filter arithmetic operation equations are to be prepared to perform the deblock filter processing on six pixels, the deblock filter processing can be further simplified.

According to the above mentioned Third Embodiment, the moving image data in the MPEG format corresponds to the compressed image data according to claim 21, 29, or 37.

Figure 18:
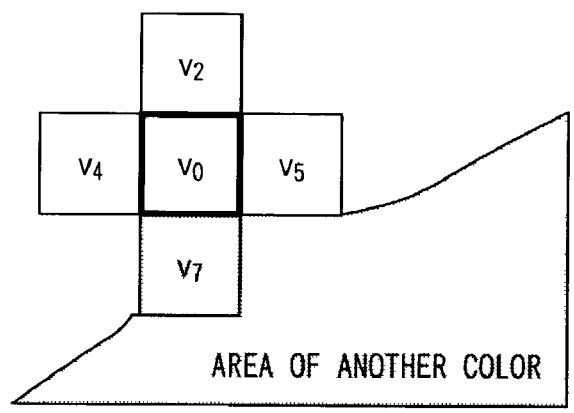
FIG. 18 shows the principle of the deringing filter processing.
Figure 19:
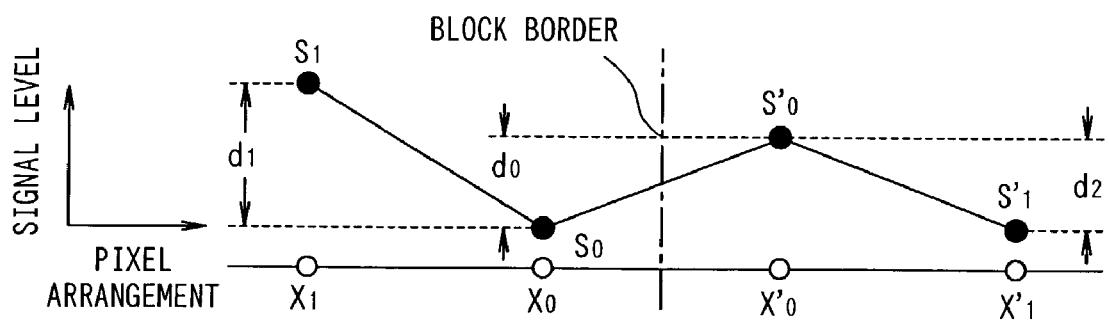
FIG. 19 shows the filter process by the conventional image processing system.
Figure 20:
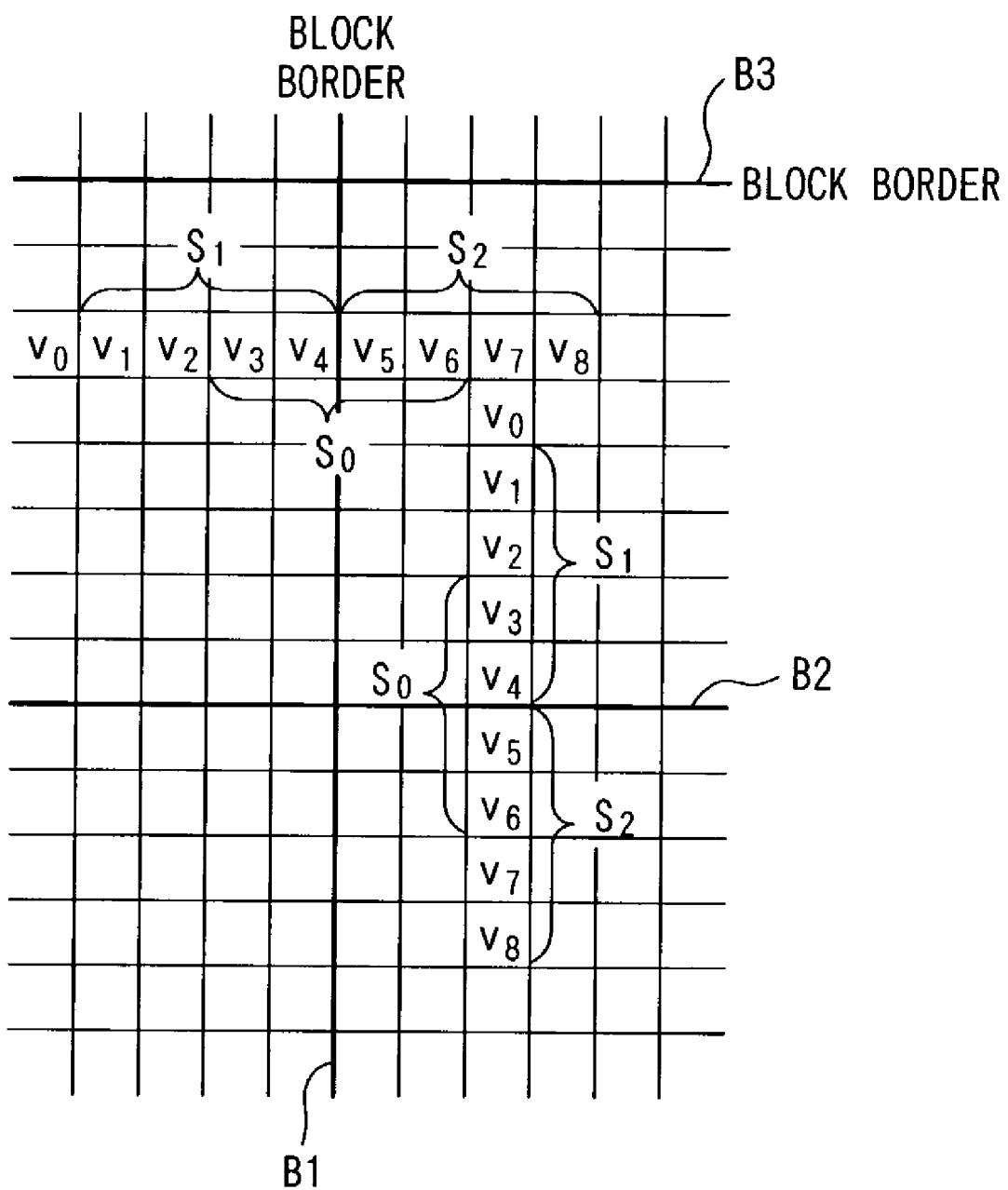
FIG. 20 shows the pixel to be referred to in the conventional image processing system.

According to the above-described First Embodiment, the deringing filter processing is configured to perform a filter arithmetic operation based on the target pixel and the eight adjacent pixels. However, the filter arithmetic operation can be performed based on the target pixel and four adjacent pixels as shown in FIG. 18. FIG. 18 is an explanatory view showing the principle of the deringing filter processing.

In FIG. 18, the value of the target pixel on which the deringing filter processing is to be performed is set to $v_0$, and the values of the pixels adjacent to the target pixel are set to $v_2$, $v_4$, $v_5$, and $v_7$ respectively for the upper, left, right, and lower adjacent pixels.

In this case, the value $v_0'$ after the deringing filter processing for the target pixel is computed by the following filter arithmetic operation equation (30).

$$V=(v_2+v_4+v_5+v_7)/4 \quad (31)$$

$$v_0'=(v_0+V)/2 \quad (32)$$

However, when an edge is detected, $v_1$ (i=2, 4, 5, 7) is replaced with $v_0$. $v_1$ is replaced with $v_0$ on the same ground as that the deblock filter processing is not performed when an edge is detected. In the example shown in FIG. 18, $v_7$ is replaced with $v_0$.

Thus, since the divisor for use in computing an average value of adjacent pixels is an integral multiple of 2, an operation can be performed by shifting bits. Furthermore, since all values of adjacent pixels are not used, the process load can be reduced. Therefore, the deringing filter processing can be further simplified.

Although four pixels are selected as the adjacent pixels, the present invention is not limited to this application. For example, any combination of adjacent pixels can be selected such as the upper left, upper right, lower left, and lower right pixels. Furthermore, by performing an operation by shifting bits, the adjacent pixels in the filter arithmetic operation can be one or two pixels from the viewpoint of reduced process load.

In this case, the moving image data in the MPEG format corresponds to the compressed image data according to claim 23, 31, or 39.

In the above described First Embodiment, the processes in the flowchart shown in FIGS. 4, 5, 6, and 8 are performed by the hardware of the post filter unit 40. However, the present invention is not limited to this application. For example, the CPU 30 can perform these processes. In this case, a control program stored in advance in the ROM 32 can be executed as according to the First Embodiment, and the program of the procedure can be read from the storage medium storing the program to the RAM 34 for execution.

According to the Second Embodiment, when the process shown in the flowchart in FIGS. 9 to 11 is performed, it is performed by the hardware of the post filter unit 40. However, the present invention is not limited to this application. For example, the CPU 30 can perform the process. In this case, according to the Second Embodiment, the control program stored in advance in the ROM 32 can be executed, but the program indicating the procedure can be read from the storage medium storing the program to the RAM 34.

In the Third Embodiment, the process shown in the flowchart in FIGS. 14 to 16 is performed by the hardware of the post filter unit 40, but the present invention is not limited to this application. That is, the CPU 30 can perform the process. In this case, according to the Third Embodiment, the control program stored in advance in the ROM 32 can be executed, but the program indicating the procedure can be read from the storage medium storing the program to the RAM 34.

A storage medium refers to a semiconductor storage medium such as RAM, ROM, etc., a magnetic storage medium such as FD, HD, etc., and an optical reading system storage medium such as a CD, a CDV, LD, DVD, etc. and the magnetic storage type/optical reading system storage medium such as an MO, etc., and any computer-readable medium can be used regardless of electronic, magnetic, or optical reading system.

According to the first, second, and third embodiments, the image processor, the image processing program, and the image processing method are applied when the deblock filter processing and the deringing filter processing are performed on the regenerated image when a moving image is regenerated by decoding moving image data compressed in the MPEG format by the computer 100 with the OS operating as a multitask as shown in FIG. 1. However, the present invention is not limited to this application without departing the scope of the invention. For example, the present invention can be applied when an image is displayed based on the image data compressed in the JPEG format, or when an image is developed in a block unit based on the compressed image data compressed in the image compressing process in which the discrete cosine transform process and the quantization transform process can be performed in a predetermined block unit.

As described above, in the image processor according to claim 1 to 17 of the present invention, when the filter arithmetic operation is performed on one pixel, the values of only two pixels are used without using an average value of a number of pixels. Therefore, as compared with the conventional technology, the filter process for reducing the block noise can be relatively simplified in decoding an image.

In the image processor according to claim 3 of the present invention, when the filter process is performed on one pixel, the value of the pixel and the value of a boundary pixel in the same pixel array and in the adjacent block are used. Therefore, an effective screen effect can be realized to a certain extent.

Furthermore, in the image processor according to claim 4 of the present invention, when the filter process is performed on one pixel, an operation is performed by addition and a subtraction and shifting bits (division by a divisor of multiple of 2) using the value of the pixel and the value of a boundary pixel in the same pixel array and in the adjacent block. Therefore, the filter process for reducing the block noise can be further simplified in decoding an image, and as compared with the image processor according to claim 3, a more effective screen effect can be realized.

Additionally, in the image processor according to claims 5 to 8, a threshold value is a constant value. Therefore, it is not necessary to compute the threshold value during the filter process. If any of the difference value among pixels exceeds the threshold value, no filter arithmetic operation is performed. Therefore, the filter process for reducing the block noise can be further simplified in decoding an image, and as compared with the conventional technology, the filter process can be performed in a relatively higher speed.

Furthermore, in the image processor according to claim 6 of the present invention, the filter process can be performed with the characteristic that the average values of the brightness between blocks are different taken into account. Therefore, an effective screen effect can be realized to a certain extent.

In addition, in the image processor according to claim 7 of the present invention, the filter process can be performed with the characteristic that the average values of the brightness between blocks are different taken into account. Therefore, as compared with the image processor according to claim 6, a more effective screen effect can be realized.

Additionally, in the image processor according to claim 8 of the present invention, the frequency of determining whether or not the filter arithmetic operation is to be performed on a pixel can be reduced. Therefore, the filter process for reducing the block noise can be performed in a higher speed in decoding an image.

Furthermore, in the image processor according to claim 9 of the present invention, the necessary image data in the filter process on each pixel in a pixel array is collectively read to the work storage means and processed in a single unit. Therefore, as compared with the conventional technology, the filter process for reducing the block noise can be performed in a relatively high speed in decoding an image.

In addition, in the image processor according to claim 10 of the present invention, three filter arithmetic operation equations are to be prepared for a filter process on six pixels. Therefore, the filter process for reducing the block noise can be further simplified in decoding an image.

Additionally, in the image processor according to claim 11 of the present invention, three filter arithmetic operation equations are to be prepared for a filter process on six pixels. Therefore, the filter process for reducing the block noise can be further simplified in decoding an image.

Furthermore, in the image processor according to claim 12 of the present invention, the filter process is performed on both pixel array in the horizontal direction in a block and pixel array in the vertical direction in a block. Therefore, an effective screen effect can be realized to a certain extent.

In addition, in the image processor according to claims 13 to 15 of the present invention, when an average value of adjacent pixels is used in a filter arithmetic operation, a divisor for use in computing an average value of adjacent pixels is constant regardless of whether or not the difference between each adjacent pixel and a target pixel exceeds a threshold value, and an operation can be performed by shifting bits if the divisor is an integral multiple of 2. Therefore, as compared with the conventional technology, the filter process for reducing the mosquito noise can be relatively simplified in decoding an image.

Furthermore, in the image processor according to claim 14 or 15 of the present invention, a threshold value is a constant value. Therefore, it is not necessary to compute the threshold value. Therefore, the filter process for reducing the mosquito noise can be further simplified in decoding an image.

Additionally, in the image processor according to claim 15 of the present invention, an effective screen effect can be realized to a certain extent.

In addition, in the image processor according to claim 16 of the present invention, when an average value of adjacent pixels are used in a filter arithmetic operation, the divisor for use in computing the average value of adjacent pixels is an integral multiple of 2. Therefore, the process load can be reduced. As a result, as compared with the conventional technology, the filter process for reducing the mosquito noise can be relatively simplified in decoding an image.

Additionally, in the image processor according to claim 17 of the present invention, when an average value of adjacent pixels is used in a filter arithmetic operation, addition is performed after a division. Therefore, as compared with the conventional technology, less memory is required for the filter process for reducing the mosquito noise in decoding an image.

Furthermore, in the image processor according to claim 18 of the present invention, since a threshold value is a constant value. Therefore, it is not necessary to compute the threshold value during the filter process. If any of the difference value among pixels exceeds the threshold value, no filter arithmetic operation is performed. Therefore, as compared with the conventional technology, the filter process for reducing the block noise can be relatively simplified in decoding an image, and the filter process can be performed in a relatively higher speed.

Furthermore, in the image processor according to claim 19 of the present invention, the necessary image data in the filter process on each pixel in a pixel array is collectively read to the work storage means and processed in a single unit. Therefore, as compared with the conventional technology, the filter process for reducing the block noise can be performed in a relatively high speed in decoding an image.

In addition, in the image processor according to claim 20 of the present invention, three filter arithmetic operation equations are to be prepared for a filter process on six pixels. Therefore, as compared with the conventional technology, the filter process for reducing the block noise can be relatively simplified in decoding an image.

Additionally, in the image processor according to claim 21 of the present invention, three filter arithmetic operation equations are to be prepared for a filter process on six pixels. Therefore, as compared with the conventional technology, the filter process for reducing the block noise can be relatively simplified in decoding an image.

In addition, in the image processor according to claim 22 of the present invention, when an average value of adjacent pixels is used in a filter arithmetic operation, a divisor for use in computing an average value of adjacent pixels is constant regardless of whether or not the difference between each adjacent pixel and a target pixel exceeds a threshold value, and an operation can be performed by shifting bits if the divisor is an integral multiple of 2. Therefore, as compared with the conventional technology, the filter process for reducing the mosquito noise can be relatively simplified in decoding an image.

In addition, in the image processor according to claim 23 of the present invention, when an average value of adjacent pixels are used in a filter arithmetic operation, the divisor for use in computing the average value of adjacent pixels is an integral multiple of 2, and an operation can be performed by shifting bits. Therefore, the process load can be reduced. As a result, as compared with the conventional technology, the filter process for reducing the mosquito noise can be relatively simplified in decoding an image.

Additionally, in the image processor according to claim 24 of the present invention, when an average value of adjacent pixels is used in a filter arithmetic operation, addition is performed after a division. Therefore, as compared with the conventional technology, less memory is required for the filter process for reducing the mosquito noise in decoding an image.

On the other hand, the image processing program according to claim 25 of the present invention provides the effect of the image processor according to claim 1.

Furthermore, the image processing program according to claim 26 of the present invention provides the effect of the image processor according to claim 18.

Furthermore, the image processing program according to claim 27 of the present invention provides the effect of the image processor according to claim 19.

Furthermore, the image processing program according to claim 28 of the present invention provides the effect of the image processor according to claim 20.

Furthermore, the image processing program according to claim 29 of the present invention provides the effect of the image processor according to claim 21.

Furthermore, the image processing program according to claim 30 of the present invention provides the effect of the image processor according to claim 22.

Furthermore, the image processing program according to claim 31 of the present invention provides the effect of the image processor according to claim 23.

Furthermore, the image processing program according to claim 32 of the present invention provides the effect of the image processor according to claim 24.

Furthermore, the image processing method according to claim 33 of the present invention provides the effect of the image processor according to claim 1.

Furthermore, the image processing method according to claim 34 of the present invention provides the effect of the image processor according to claim 18.

Furthermore, the image processing method according to claim 35 of the present invention provides the effect of the image processor according to claim 19.

Furthermore, the image processing method according to claim 36 of the present invention provides the effect of the image processor according to claim 20.

Furthermore, the image processing method according to claim 37 of the present invention provides the effect of the image processor according to claim 21.

Furthermore, the image processing method according to claim 38 of the present invention provides the effect of the image processor according to claim 22.

Furthermore, the image processing method according to claim 39 of the present invention provides the effect of the image processor according to claim 23.

Furthermore, the image processing method according to claim 40 of the present invention provides the effect of the image processor according to claim 24.

What is claimed is:

1. An image processor for performing filter processing on an expanded image when or after the image is expanded in a unit of predetermined blocks based on compressed image data compressed by image compression, in which discrete cosine transform and quantization are performed in the unit of blocks,
    wherein the filter processing is performed such that filter arithmetic operation is performed on one pixel in the block only based on a value of the pixel and a value of any one of pixels in an adjacent block, and such that filter arithmetic operation is performed on one of pixels in a pixel array intersecting a border between adjacent blocks when no difference between pixels exceeds a threshold value, the pixels ranging from one pixel to a border pixel positioned on the border in the same pixel array in the adjacent block, and a constant value is used as the threshold value, and
    wherein a threshold value for comparison with a difference between the border pixel and a adjacent pixel being adjacent to the border pixel is set larger than a threshold value for comparison with a difference between the border pixel and a pixel other than the adjacent pixel.

2. The image processor according to claim 1, wherein the filter processing is performed such that filter arithmetic operation is performed on one of pixels in a pixel array intersecting a border between adjacent blocks, only based on a value of the pixel and a value of any one of pixels in the same pixel array of the adjacent block.

3. The image processor according to claim 1, wherein the filter processing is performed such that filter arithmetic operation is performed on one of pixels in a pixel array intersecting a border between adjacent blocks, only based on a value of the pixel and a value of a border pixel positioned on the border in the same pixel array of an adjacent block.

4. The image processor according to any one of claim 1, wherein the filter processing is performed such that as to a pixel array intersecting a border between adjacent blocks, when pixel values on one side of the border is referred to as v4, v3, and v2 in the order of being close to the border and pixel values on the opposite side of the border are referred to as v5, v6, and v7 in the order of being close to the border, pixel values v2' to v7' after filtering are computed by filter arithmetic equations of "v2'=(v2+v5)/2+(v2−v5)/4", "v3'=(v3+v5)/2+(v3−v5)/8", "v4'=(v4+v5)/2", "v5'=(v5+v4)/2+(v5−v4)/8", "v6'=(v6+v4)/2+(v6−v4)/4", and "v7'=(v7−(v7−v4)/8".

5. The image processor according to claim 1, wherein a threshold value for comparing a difference between the border pixel and the adjacent pixel being adjacent to the border pixel is set at a value equivalent to "2n−3" or an approximate value while a pixel has a maximum value of "2n−1" (n≧4), and
    a threshold value for comparing a difference between the border pixel and a pixel other than the adjacent pixel is set at a value equivalent to "2n−4" or an approximate value.

6. The image processor according to claim 1, wherein the filter processing is performed such that judgment is made on whether the filter arithmetic operation should be performed on a pixel, in a direction of sequentially moving away from the border, the judgment being started from an adjacent pixel being adjacent to the border pixel, and when it is judged that the filter arithmetic operation should not be performed on a pixel, the filter arithmetic operation is not performed on the pixel and pixels in the later stages.

7. The image processor according to claim 1, further comprising memory means for work which is availably connected to image memory means for storing the expanded image and has a sufficient storage capacity for storing data of all pixels ranging from one pixel, which is the farthest from the border in a block among pixels of a pixel array intersecting the border between adjacent blocks, to a border pixel, which is in the same pixel array and is positioned at the border in an adjacent block, the filter processing is performed such that data of all pixels ranging from one pixel to the border pixel in the pixel array is read from the image memory means to the memory means for work in an integrated manner, and the filter arithmetic operation is performed based on the pixel data of the memory means for work.

8. The image processor according to claim 1, wherein the filter processing is performed such that as to a pixel array intersecting a border between adjacent blocks, when pixel values on one side of the border are referred to as v4, v3, and v2 in the order of being close to the border and pixel values on the opposite side of the border are referred to as v5, v6, and v7 in the order of being close to the border, pixel values v2' to v4' after filtering are computed by filter arithmetic equations of "v2'=(v2+v5)/2+(v2−v5)/4", "v3'=(v3+v5)/2+(v3−v5)/8", and "v4'=(v4+v5)/2", and pixel values v5' to v7' after filtering are computed by the filter arithmetic equations by using v4 to v7 as v5, v4, v3, and v2.

9. The image processor according to claim 1, wherein the filter processing is performed such that as to a pixel array intersecting a border between adjacent blocks, when pixel values on one side of the border are referred to as v4, v3, and v2 in the order of being close to the border and pixel values on the opposite side of the border are referred to as v5, v6, and v7 in the order of being close to the border, pixel values v5' to v7' after filtering are computed by filter arithmetic equations of "v5'=(v5+v4)/2+(v5−v4)/8", "v6'=(v6+v4)/2+(v6−v4)/4", and "v7'=(v7−(v7−v4)/8", and pixel values v2' to v4' after filtering are computed by the filter arithmetic equations by using v2 to v5 as v7, v6, v5, and v4.

10. The image processor according to claim 1, wherein the filter processing is performed such that the filter arithmetic operation is performed on one of a pixel array in a horizontal direction and a pixel array in a vertical direction in the block, and then, the filter arithmetic operation is performed on the other.

11. The image processor according to claim 1, wherein the quantization is performed as processing for roughly quantizing high-frequency components of the results of the discrete cosine transform, and the filter processing is performed such that filter arithmetic operation is performed on one pixel based on a value of a target pixel to be computed and values of adjacent pixels being adjacent to the target pixel, and in the filter arithmetic operation, when a difference between one pixel and the target pixel of the adjacent pixels exceeds a threshold value, the value of the target pixel is used instead of the value of one pixel.

12. The image processor according to claim 11, wherein the filter processing is performed using a constant value as the threshold value.

13. The image processor according to claim 12, wherein the filter processing is performed such that the threshold value is set at a value equivalent to "2n−4" or an approximate value while the pixel has a maximum value of "2n−1" (n≧4).

14. The image processor according to claim 1, wherein the quantization is performed as processing for roughly quantizing high-frequency components of the results of the discrete cosine transform, and the filter processing is performed such that filter arithmetic operation is performed on one pixel based on a value of a target pixel to be computed and values of four, two, or one adjacent pixel being adjacent to the target pixel.

15. The image processor according to claim 1, wherein the quantization is performed as processing for roughly quantizing high-frequency components of the results of the discrete cosine transform, and the filter processing is performed such that filter arithmetic operation is performed on one pixel by dividing a value of a target pixel to be computed by a predetermined value, dividing a value of an adjacent pixel being adjacent to the target pixel by the predetermined value, and adding the division results.

16. An image processing program stored on a computer readable medium for causing a computer to perform filter processing on an expanded image when or after the image is expanded in the unit of predetermined blocks based on compressed image data compressed by image compression, in which discrete cosine transform and quantization are performed in the unit of blocks, wherein the filter processing is performed such that filter arithmetic operation is performed on one pixel in the block only based on a value of the pixel and a value of any one of pixels in an adjacent block, and such that filter arithmetic operation is performed on one of pixels in a pixel array intersecting a border between adjacent blocks when no difference between pixels exceeds a threshold value, the pixels ranging from one pixel to a border pixel positioned on the border in the same pixel array in the adjacent block, and a constant value is used as the threshold value, and wherein a threshold value for comparison with a difference between the border pixel and a adjacent pixel being adjacent to the border pixel is set larger than a threshold value for comparison with a difference between the border pixel and a pixel other than the adjacent pixel.

17. The image processing program according to claim 16, wherein the filter processing is performed such that as to a pixel array intersecting a border between adjacent blocks, when pixel values on one side of the border are referred to as v4, v3, and v2 in the order of being close to the border and pixel values on the opposite side of the border are referred to as v5, v6, and v7 in the order of being close to the border, pixel values v2' to v4' after filtering are computed by filter arithmetic equations of "v2'=(v2+v5)/2+(v2−v5)/4", "v3'=(v3+v5)/2+(v3−v5)/8", and "v4'=(v4+v5)/2", and pixel values v5' to v7' after filtering are computed by the filter arithmetic equations by using v4 to v7 as v5, v4, v3, and v2.

18. The image processing program according to claim 16, wherein the filter processing is performed such that as to a pixel array intersecting a border between adjacent blocks, when pixel values on one side of the border are referred to as v4, v3, and v2 in the order of being close to the border and pixel values on the opposite side of the border are referred to as v5, v6, and v7 in the order of being close to the border, pixel values v5' to v7' after filtering are computed by filter arithmetic equations of "v5'=(v5+v4)/2+(v5−v4)/8", "v6'=(v6+v4)/2+(v6−v4)/4", and "v7'=(v7−(v7−v4)/8", and pixel values v2' to v4' after filtering are computed by the filter arithmetic equations by using v2 to v5 as v7, v6, v5, and v4.

19. An image processing method for performing filter processing on an expanded image when or after the image is expanded in the unit of predetermined blocks based on compressed image data compressed by image compression, in which discrete cosine transform and quantization are performed in the unit of blocks, wherein the filter processing is performed such that filter arithmetic operation is performed on one pixel in the block only based on a value of the pixel and a value of any one of pixels in an adjacent block, and such that filter arithmetic operation is performed on one of pixels in a pixel array intersecting a border between adjacent blocks when no difference between pixels exceeds a threshold value, the pixels ranging from one pixel to a border pixel positioned on the border in the same pixel array in the adjacent block, and a constant value is used as the threshold value, and wherein a threshold value for comparison with a difference between the border pixel and a adjacent pixel being adjacent to the border pixel is set larger than a threshold value for comparison with a difference between the border pixel and a pixel other than the adjacent pixel.

20. The image processing method according to claim 19, wherein the filter processing is performed such that as to a pixel array intersecting a border between adjacent blocks, when pixel values on one side of the border are referred to as v4, v3, and v2 in the order of being close to the border and pixel values on the opposite side of the border are referred to as v5, v6, and v7 in the order of being close to the border pixel values, v2' to v4' after filtering are computed by filter arithmetic equations of "v2'=(v2+v5)/2+(v2−v5)/4", "v3'=(v3+v5)/2+(v3−v5)/8", and "v4'=(v4+v5)/2", and pixel values v5' to v7' after filtering are computed by the filter arithmetic equations by using v4 to v7 as v5, v4, v3, and v2.

21. The image processing method according to claim 19, wherein the filter processing is performed such that as to a pixel array intersecting a border between adjacent blocks, when pixel values on one side of the border are referred to as v4, v3, and v2 in the order of being close to the border and pixel values on the opposite side of the border are referred to as v5, v6, and v7 in the order of being close to the border pixel values, v5' to v7' after filtering are computed by filter arithmetic equations of "v5'=(v5+v4)/2+(v5−v4)/8", "v6'=(v6+v4)/2+(v6−v4)/4", and "v7'=(v7−(v7−v4)/8", and pixel values v2' to v4' after filtering are computed by the filter arithmetic equations by using v2 to v5 as v7, v6, v5, and v4.

* * * * *